(12) United States Patent
Tokuda et al.

(10) Patent No.: US 8,284,355 B2
(45) Date of Patent: Oct. 9, 2012

(54) ACTIVE MATRIX SUBSTRATE HAVING SPACERS, LIQUID CRYSTAL DISPLAY PANEL HAVING SPACERS, LIQUID CRYSTAL DISPLAY ELEMENT, LIQUID CRYSTAL DISPLAY DEVICE, AND SUBSTRATE FOR LIQUID CRYSTAL DISPLAY PANELS

(75) Inventors: Tsuyoshi Tokuda, Tsu (JP); Hiroto Akiyama, Tsu (JP); Akihiro Shoraku, Suzuka (JP); Toshihide Tsubata, Tsu (JP); Yukio Kurozumi, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 668 days.

(21) Appl. No.: 12/444,772

(22) PCT Filed: Oct. 12, 2007

(86) PCT No.: PCT/JP2007/069948
§ 371 (c)(1),
(2), (4) Date: Apr. 8, 2009

(87) PCT Pub. No.: WO2008/065818
PCT Pub. Date: Jun. 5, 2008

(65) Prior Publication Data
US 2010/0045906 A1    Feb. 25, 2010

(30) Foreign Application Priority Data
Nov. 30, 2006 (JP) .................... 2006-324659

(51) Int. Cl.
*G02F 1/1333* (2006.01)
(52) U.S. Cl. ..................................... 349/110
(58) Field of Classification Search ............... 349/110, 349/149, 155, 123, 141, 38
See application file for complete search history.

(56) References Cited

U.S. PATENT DOCUMENTS

| | | | |
|---|---|---|---|
| 6,211,937 B1 | 4/2001 | Miyachi et al. | |
| 6,661,488 B1 | 12/2003 | Takeda | |
| 6,724,452 B1 | 4/2004 | Takeda | |
| 6,870,593 B2 * | 3/2005 | Satoh | 349/155 |
| 7,167,224 B1 | 1/2007 | Takeda | |
| 7,224,421 B1 | 5/2007 | Takeda | |
| 7,304,703 B1 | 12/2007 | Takeda | |

(Continued)

FOREIGN PATENT DOCUMENTS
JP   10-039318 A   2/1998
(Continued)

OTHER PUBLICATIONS

Supplementary European Search Report mailed May 11, 2010 in corresponding EP application 07829684.5.

(Continued)

*Primary Examiner* — Akm Enayet Ullah
(74) *Attorney, Agent, or Firm* — Nixon & Vanderhye P.C.

(57) ABSTRACT

The present invention has an object to provide an active matrix substrate, a liquid crystal display panel, a liquid crystal display element, a liquid crystal display device, and a substrate for liquid crystal display panel, each capable of suppressing generation of uneven cell gap without increase in a parasitic capacitance of a wiring. The active matrix substrate of the present invention is an active matrix substrate including a spacer on a substrate, wherein the spacer includes a base layer and a covering layer, the base layer being buried in the covering layer.

41 Claims, 11 Drawing Sheets

U.S. PATENT DOCUMENTS

| | | | |
|---|---|---|---|
| 2003/0048403 A1 | 3/2003 | Satoh | |
| 2004/0119924 A1 | 6/2004 | Takeda | |
| 2004/0125322 A1 | 7/2004 | Sawasaki | |
| 2004/0227891 A1 | 11/2004 | Hirota | |
| 2005/0140858 A1* | 6/2005 | Park | 349/110 |
| 2005/0157245 A1* | 7/2005 | Lin et al. | 349/155 |
| 2006/0055861 A1 | 3/2006 | Hirota | |
| 2006/0181665 A1 | 8/2006 | Hirota | |
| 2007/0064187 A1 | 3/2007 | Takeda | |
| 2008/0165314 A1 | 7/2008 | Takeda | |
| 2008/0299690 A1 | 12/2008 | Hirota | |

FOREIGN PATENT DOCUMENTS

| | | |
|---|---|---|
| JP | 10-197877 | 7/1998 |
| JP | 10-206840 | 8/1998 |
| JP | 11-174467 | 7/1999 |
| JP | 11-242225 | 9/1999 |
| JP | 2000-298280 | 10/2000 |
| JP | 2001-51266 | 2/2001 |
| JP | 2002-040440 | 2/2002 |
| JP | 2003-084289 | 3/2003 |
| JP | 2004-029386 | 1/2004 |
| JP | 2004-151459 | 5/2004 |
| JP | 2004-341465 | 12/2004 |
| JP | 2005-122150 | 5/2005 |
| JP | 2005-326472 | 11/2005 |
| SG | 89412 | 7/2001 |

OTHER PUBLICATIONS

Chinese Office Action and English translation thereof mailed Apr. 8, 2010 in corresponding Chinese application 200780035294.X.

International Search Report for PCT/JP2007/069948, mailed Nov. 20, 2007.

* cited by examiner (a)

ACTIVE MATRIX SUBSTRATE HAVING SPACERS, LIQUID CRYSTAL DISPLAY PANEL HAVING SPACERS, LIQUID CRYSTAL DISPLAY ELEMENT, LIQUID CRYSTAL DISPLAY DEVICE, AND SUBSTRATE FOR LIQUID CRYSTAL DISPLAY PANELS

This application is the U.S. national phase of International Application No. PCT/JP2007/069948, filed 12 Oct. 2007, which designated the U.S. and claims priority to Japanese Application No. 2006-324659, filed 30 Nov. 2006, the entire contents of each of which are hereby incorporated by reference.

TECHNICAL FIELD

The present invention relates to an active matrix substrate, a liquid crystal display panel, a liquid crystal display element, a liquid crystal display device, and a substrate for liquid crystal display panels. More specifically, the present invention relates to an active matrix substrate, a liquid crystal display panel, a liquid crystal display element, a liquid crystal display device, and a substrate for liquid crystal display panels, each including a spacer on a substrate.

BACKGROUND ART

A color liquid crystal display device which is currently widely used includes a color filter arranged in a sub-pixel (dot). Color filters of three primary colors of light, i.e., red (R), green (G), and blue (B), are arranged in sub-pixels in a specific pattern, typically. Thus, according to the color liquid crystal display device, one pixel is composed of three sub-pixels of R, G, and B. This pixel serves as the minimum constitutional unit of a screen to provide color display. The colors of the color filters, that is, the combination of the colors of the sub-pixels are not limited to the combination of R, G, and B. A combination of cyan (C), magenta (M), and yellow (Y) or another combination may be employed. As the array of the color filters, a stripe array, a delta array, and a mosaic array have been known.

A common color liquid crystal display device has a structure in which a liquid crystal layer is formed between a pair of substrates, and a plurality of color filter layers are formed on either one of the pair of substrates. For example, an active matrix driving liquid crystal display device has a structure in which an active matrix substrate including circuit elements such as a pixel electrode and a thin film transistor (TFT) (hereinafter, also referred to as a "TFT substrate") and a counter substrate including a counter electrode and a color filter layer and the like are arranged with a liquid crystal layer therebetween. The counter substrate including the color filter layer is often called color filter substrate.

Production processes of such a color liquid crystal display device include a step of attaching and fixing the color filter substrate to the TFT substrate. In this case, a spacer is arranged between the color filter substrate and the TFT substrate in order to keep a thickness of the liquid crystal layer (hereinafter, also referred to as a "cell gap") uniform. However, in a television receiver field and the like, degradation in display qualities, due to the spacer, becomes a problem with an improvement in display qualities of the liquid crystal display device.

Bead spacers or rod spacers with a specific diameter are sprayed on the color filter substrate or TFT substrate surface, thereby arranging the spacers between the color filter substrate and the TFT substrate, conventionally. However, in this case, it is difficult to arrange the spacers on the entire display surface of the liquid crystal display device at a uniform density. Therefore, the cell gap is not uniform, or the spacers gather, which often causes display defects. In addition, due to the spacer arranged in the sub-pixel, the aperture ratio is substantially reduced or the spacer is observed as a luminescent spot.

A method in which a spacer is selectively arranged in a specific region outside a sub-pixel, typically arranged in a black matrix or a region shielded by a wiring arranged on a TFT substrate has been developed. For example, a method in which a column spacer is arranged in a specific region on a color filter substrate and/or a TFT substrate by a photolithography process using a photosensitive resin (also referred to as a "photoresist") has been practically used.

The following liquid crystal display device is disclosed, for example (for example, refer to Patent Document 1). A plurality of column spacers for regulating a distance between the TFT substrate and the color filter substrate are arranged in a region which does not transmit light between a plurality of effective pixels to have a height equal to a specific distance between the substrates. The top surfaces of these column spacers are in touch with an internal surface of the other substrate. A column spacer made of a photosensitive resin, that is, a photo spacer (hereinafter, also referred to as a "PS") is arranged on the color filter substrate of this liquid crystal display device. On the TFT substrate, at apart where the PS is in contact with the TFT substrate, a gate wiring and a data wiring overlap with each other with an insulating film therebetween to generate a bulge. In addition, the following color filter (color filter substrate), is disclosed, for example (for example, refer to Patent Document 2). A foundation is formed using a black matrix layer and at least one or more kinds of colored layers of the three primary colors outside a screen, and on the foundation, a resin column (PS) is further arranged.

In addition, the following active matrix substrate is disclosed, for example (for example, refer to Patent Document 3). A column spacer is bonded to a part which has an irregular surface and has a substantially tapered cross-section, such as a gate wiring, and the column spacer has a taper angle in accordance with the tapered shape of the gate wiring. Further, the following In-Plane Switching active matrix liquid crystal display device is disclosed, for example (for example, refer to Patent Document 4). A long thin insulator bump is formed to cover a video signal wiring and serves as a spacer for determining a liquid crystal cell gap when a liquid crystal cell is assembled.

The following color filter substrate is disclosed as a technology of suppressing foaming of a liquid crystal layer at low temperatures and improving withstand load characteristics, for example (for example, refer to Patent Document 5). The color filter substrate includes two different column spacers different in height.

FIG. 17(*a*) is a planar view schematically showing a configuration of the color filter substrate disclosed in Patent Document 5. FIG. 17(*b*) is a cross-sectional view schematically showing the color filter substrate taken along line A-B in FIG. 17(*a*).

This color filter substrate includes column spacers 78 and 79 arranged in a region outside the sub-pixel, as shown in FIG. 17(*a*). In the region outside the sub-pixel of the color filter substrate 70, as shown in FIG. 17(*b*), a black matrix 72, color filters 73 and 74, and a common electrode 75 are stacked on a transparent substrate 71. Thereon, a photosensitive resin layer 76 and an alignment film 77 are formed. The color filter 73 and the color filter 74 adjacent thereto are different in thickness, and by this thickness, the column spacers 78 and 79 are different in height.

[Patent Document 1]
Japanese Kokai Publication No. 2000-298280
[Patent Document 2]
Japanese Kokai Publication No. 2001-51266
[Patent Document 3]
Japanese Kokai Publication No. He-11-174467
[Patent Document 4]
Japanese Kokai Publication No. 2004-341465
[Patent Document 5]
Japanese Kokai Publication No. 2003-84289

DISCLOSURE OF INVENTION

FIGS. 18(a) to 18(c) are cross-sectional views schematically showing a PS-forming process in Patent Documents 1 and 2.

As shown in FIG. 18(a), a photoresist 111 is formed on a substrate or a foundation 110 composed of colored layers and the like, and the photoresist 111 is exposed through a photomask 112. Then, as shown in FIG. 18(b), the exposed photoresist 111 is developed and thermally cured. As a result, a PS 50 is formed, as shown in FIG. 18(c).

However, according to this method, as shown in FIG. 18(c), edges of a top (upper surface or upper base) of the PS 50 bulge due to internal stress in the thermocuring step. Therefore, sufficient flatness can not be secured in certain instances. Therefore, as shown in FIG. 19, when a load is locally (partially) applied from a counter substrate 20 to the PS 50 in the liquid crystal display panel having a liquid crystal layer 61, the PS 50 is crushed and the cell gap is locally and irreversibly decreased. As a result, the cell gap becomes uneven. Accordingly, as a material for the PS 50, a material which can secure the flatness of the top of the PS 50 after the thermocuring step needs to be selected. However, only a few materials can secure it, generally. Therefore, there is room for improvement in that a degree of freedom of material selection is low, which affects simplification of production steps and production facilities.

According to the active matrix substrate in Patent Document 1, a bulge where a gate wiring and a data wiring overlap with each other with an insulating film therebetween is used as a part of the portion with which the PS is in contact. In such a case, as an area of the overlapping part between the gate wiring and the source wiring increases, a parasitic capacitance of each wiring becomes larger. Particularly on an active matrix substrate in a stripe array, an extra overlapping between the gate wiring and the source wiring needs to be formed, and therefore, this parasitic capacitance is further increased. Due to such an increase in the parasitic capacitance in the wiring, power consumption is increased, or if a frame frequency is increased to improve visibility of moving images, a pixel becomes insufficient in charging. In such a point, this active matrix substrate has room for improvement.

According to the configuration in Patent Document 3, a gate wiring and the like is wider than the resin layer constituting the spacer, and therefore, a part overlapping with the gate wiring and the like of the edge of the spacer top bulges. As a result, the spacer has no flat top, and therefore, if a load is locally (partially) applied to the liquid crystal display panel surface, the cell gap becomes uneven because of the same reason as in Patent Documents 1 and 2. In such a point, the active matrix in patent Document 3 has room for improvement.

According to the configuration in Patent Document 4, a bump which serves as a spacer is arranged in a wall shape. If the bump crosses with a scanning line, a part overlapping with the scanning line of the bump top bulges, and the bump has no flat top. In addition, if the bump is not formed in a region where the scanning line crosses with a video signal line, the video signal line is wider than the bump. Therefore, a part overlapping with the scanning line of the edge of the bump top bulges, and as a result, the bump has no flat top. Thus, the liquid crystal display device in Patent Document 4 has still room for improvement in the same point as in Patent Document 3.

According to the configuration in Patent Document 5, if color filters 73 and 74 different in thickness are used, a thickness of a liquid crystal layer in some pixels is different from a thickness of the liquid crystal layer in other pixels. Therefore, in some pixels, a retardation which the liquid crystal layer gives for light becomes different from that in other pixels. As a result, a change in a display color at the time of black state or intermediate state is generated, which reduces display qualities. In such a case, the color filter substrate in Patent Document 5 has room for improvement.

The present invention has been made in view of the above-mentioned state of the art. The present invention has an object to provide an active matrix substrate, a liquid crystal display panel, a liquid crystal display element, a liquid crystal display device, and a substrate for liquid crystal display panels, each of which can suppress generation of uneven cell gap without increasing a parasitic capacitance of a wiring.

The present inventors made various investigations on an active matrix substrate including a spacer on a substrate. The inventors noted a production method shown in FIGS. 20(a) to 20(c). Specifically, a photoresist 111 is formed on a base layer 62 which has been formed on a foundation 110, and then, the photoresist 111 around the base layer 62 is exposed through a photomask 112, as shown in FIG. 20(a). Then, as shown in FIG. 20(b), the exposed photoresist 111 is developed and then thermally cured. As a result, as shown in FIG. 20(c), a spacer 46 composed of the base layer 62 and a covering layer 40 in which the base layer 62 is buried can be formed. According to such a configuration of the spacer 46, the base layer 62 pushed up a depression part which is formed when the edge of the covering layer 40 bulges in the thermocuring step, and the like. Therefore, the top of the spacer 46 can be flattened, which can suppress generation of the uneven cell gap.

Further, the present inventors found the following. According to such a configuration of the spacer 46, a common material which can not suppress a bulge of the edge in the thermocuring step can be used as a material for the covering layer 40. Therefore, a degree of freedom of material selection can be enhanced. As a result, production steps and production facilities can be simplified, and further, the overlapping structure of the wirings does not need to be used as the base layer 62, and an area of such an overlapping structure does not need to be increased, either. Therefore, the increase in parasitic capacitance of the wirings in the active matrix substrate can be suppressed. As a result, the above-mentioned problems have been admirably solved, leading to completion of the present invention.

That is, the present invention is an active matrix substrate including a spacer (also referred to as "the first spacer") on a substrate, wherein the spacer includes a base layer and a covering layer, the base layer being buried in the covering layer.

The present invention is mentioned below in more detail.

The active matrix substrate of the present invention includes the first spacer on a substrate. The active matrix substrate is not especially limited to a normal array substrate.

The active matrix substrate includes an array substrate on which a black matrix is arranged (BM on Array) and an array substrate on which a color filter is arranged (color filter on array) and the like in order to reduce a region which depends on alignment accuracy between the array and the black matrix. It is preferable that the color filters are arranged on a substrate (counter substrate) opposite to the active matrix substrate in the liquid crystal display panel in view of shortening of lead time and easy procurement. The substrate is not especially limited, and an insulating substrate, a semiconductor substrate, and the like, can be used.

In the present description, "the first spacer" is a component which regulates a cell gap by being in contact with a surface of the counter substrate, the surface having a planar area larger than that of a top of the first spacer, when the active matrix substrate of the present invention is attached to the counter substrate. According to the active matrix substrate of the present invention, a plurality of the first spacers are generally arranged on the substrate. The first spacer may have any three-dimensional shape, and it may be a columnar or wall shape, or may be another shape. It is preferable that the three-dimensional shape of the first spacer is a columnar shape in order to spread liquid crystal smoothly inside the liquid crystal display panel when the liquid crystal is injected into the liquid crystal display panel or in order to suppress generation of uneven thickness of an alignment film when the film is formed. The planar shape of the first spacer is not especially limited, and it may be a polygonal shape such as a triangular shape and a square shape, an elliptical shape, a circular shape, and the like.

The first spacer is composed of the first base layer and the first covering layer in which the first base layer is buried. Thus, if the first base layer is buried in the first covering layer, the first base layer can push up the depression part which is formed when the edge of the first covering layer bulges in the thermocuring step and the like. Therefore, the top of the first spacer, which is in contact with the counter substrate, can be flattened. As a result, the uneven cell gap which is partially generated by a load of the liquid crystal display panel prepared by attachment of the active matrix substrate of the present invention to the counter substrate can be suppressed. Therefore, a common material which can not suppress a bulge at the edge in the thermocuring step and the like also can be used as a material for the first covering layer, and therefore, a degree of freedom of material selection can be enhanced. Further, according to such a configuration of the first spacer, the first base layer is planarly surrounded by the first covering layer, and arranged independently from another layer. Therefore, the overlapping structure of the wirings does not need to be used as the first base layer, and an area of such a structure does not need to be increased, either. Therefore, an increase in parasitic capacitance of the wirings in the active matrix substrate can be suppressed.

The upper and side surfaces of the above-mentioned first base layer are covered with the first covering layer. If the first covering layer has perfect light-shielding property, the first base layer can not be observed because of presence of the first covering layer. As long as the first base layer is buried in the first covering layer, the planar shape of the first base layer is not especially limited and it may be a linear shape, a polygonal shape such as a triangular shape and a square shape, an elliptical shape, a circular shape, and the like. It is preferable that the first base layer has a circular or almost circular (for example, regular octagonal) shape in order to be formed to have the minimum area while suppressing overlapping with an edge bulge of the first covering layer.

It is preferable that the top of the above-mentioned first base layer is buried in the first covering layer, and a distance between an edge (periphery) of the top of the first base layer and an edge of the top of the first covering layer is 5 μm or more. If the distance between the edge of the top of the first base layer and the edge of the top of the first covering layer is less than 5 μm, the edge of the top of the first covering layer is also pushed up by the first base layer. Therefore, the top of the first spacer might not be sufficiently flattened.

The difference in height of the top of the first spacer is preferably 0.1 μm or less and more preferably 0.05 μm or less.

It is preferable that if the first base layer has a circular planar shape, the first base layer has a bottom having a diameter of 10 μm or more. If the diameter is less than 10 μm, the top of the first spacer sharpens, which might not be flattened. From the same reason, it is preferable that if the first base layer does not have a circular planar shape, the first base layer has the minimum line width of 10 μm or more.

The above-mentioned first base layer may have a single layer structure or a multi-layer structure. The first base layer preferably has a single layer structure in order to improve uniformity of a thickness of a film constituting the first base layer in the substrate plane in production processes. It is preferable that the first base layer has a multi-layer structure if the first base layer having a single layer structure has an insufficient height. The first covering layer also may have a single-layer structure or a multi-layer structure. It is preferable that the first covering layer has a single-layer structure in order to simplify the production steps. In the present invention, if the first covering layer has a multi-layer structure, at least one of layers constituting the multi-layer structure covers the first base layer. However, it is preferable that the first base layer is buried in all of the constituting layers the first base layer in order to flatten the top of the first spacer.

A plurality of the above-mentioned base layers may be formed in each the first spacer. The material for the first base layer is not especially limited, and a conductive material, a semiconductive material, an insulating material, and the like may be mentioned.

The active matrix substrate of the present invention is not especially limited as long as it includes the above-mentioned substrate and the first spacer as a component. The active matrix substrate may or may not include other components.

Preferable embodiments of the active matrix substrate of the present invention are mentioned below in more detail.

It is preferable that the first base layer has a thickness of submicron order. In the present description, the "submicron order" means a thickness of less than 1 μm (¹⁄₁₀₀₀ mm). The first spacer generally has a height of micron order. Therefore, if the first covering layer is formed on the substrate without the first base layer, the difference in height of the top of the first covering layer is often a difference of submicron order. Accordingly, the first base layer has a thickness of submicron order, and thereby the flatness of the top of the first spacer can be more improved. According to this, the height of the first spacer can be substantially continuously varied in submicron order, which is suitable to form the spacer having a height difference of submicron order on one substrate.

It is preferable that the thickness of the first base layer is larger than a difference in height, generated between the edge and the center of the top of the first covering layer in the case that the first covering layer is formed on the substrate without the first base layer. It is more preferable that the thickness of the first base layer is larger than the difference by 0.2 μm or more. If the thickness is larger than the difference by less than 0.2 μm, the thickness of the first base layer is too small relative to the thickness of the first covering layer because of flattening effects at the time when the first covering layer is applied. Therefore, the flattening property of the top of the first spacer might not be sufficiently obtained. It is preferable that the first base layer has a thickness smaller than that of the first covering layer in view of adjustment in height between the first spacer and the second spacer.

It is preferable that the active matrix substrate includes a scanning line, a signal line, a switching element, and a pixel electrode on the substrate, and the first base layer is made of a material for a component of the active matrix substrate. Further, it is preferable that the first base layer is composed of a multilayer film made of the material constituting the component of the active matrix substrate. According to this, the first base layer and the component of the active matrix substrate can be formed in the same step, and therefore a step of forming the first base layer does not need to be separately performed. Most of the components of the active matrix substrate have a thickness of submicron order, which is preferable for the first base layer to improve the flatness of the top of the first spacer.

The component of the above-mentioned active matrix substrate is not especially limited. The following components are mentioned: a scanning line; a signal line; a gate electrode, a source electrode, a drain electrode, and a semiconductor layer, each constituting a switching element; an interlayer insulating film; and a pixel electrode. The scanning line and the signal line are generally arranged to be perpendicular to each other, and at an intersection of the two lines, a switching element is arranged. It is preferable that the pixel electrode is formed on an insulating film covering over the scanning line, the signal line, and the switching element in order to improve an aperture ratio. In this case, the pixel electrode is connected to the switching element through a contact hole formed in the insulating film. A thin film transistor (TFT), a thin film diode (TFD), a MIM (Metal-Insulator-Metal), and the like, are mentioned as the switching element.

It is preferable that the first base layer is made of a material for at least one component selected from the group consisting of the scanning line, the signal line, a semiconductor layer of the switching element, and the pixel electrode. It is also preferable that the first base layer is composed of a multilayer film made of the material for the at least one component selected from the group consisting of the scanning line, the signal line, the semiconductor layer of the switching element, and the pixel electrode. The scanning line, the signal line, the semiconductor layer of the switching element, and the pixel electrode generally have a thickness of submicron order and are components of the active matrix substrate. Accordingly, if the first base layer is made of a material for these components or is composed of a multilayer film made of the material for these components, the top of the first spacer can be flattened without an increase in the production steps.

It is preferable that the first covering layer includes a resin. According to this, the first covering layer can be formed by a spin-coating method, a die-coating method, and the like. Therefore, the first spacer having a height or micron order can be relatively easily formed. It is preferable that the resin constituting the first covering layer is a photosensitive resin. According to this, the first covering layer can be formed by a photolithography process, which makes it possible to form the first covering layer more easily.

It is preferable that the first covering layer includes a positive photosensitive resin. That is, it is preferable that a part which is to be photo-irradiated of the first covering layer includes a photosensitive resin which is soluble in a solvent (developer). A positive photosensitive resin is generally used to form an active matrix substrate, particularly a thin film transistor (TFT), and the like, because it is advantageous in view of yield or formation of fine pattern. According to this, a common photolithography system such as exposure and development systems can be used for forming the first covering layer and the active matrix substrate. Therefore, a photolithography system for forming the first covering layer does not need to be separately prepared.

The above-mentioned positive photosensitive resin is not especially limited. Among these, a novolac resin is preferable. That is, it is preferable that the above-mentioned first covering layer includes a novolac resin. In this case, tetramethylammonium hydroxide (TMAH) can be used together as a developer. In a liquid crystal display device in Multi-domain Vertical Alignment (MVA) system, and the like, a structure for controlling alignment of liquid crystal molecules constituting a liquid crystal layer (hereinafter, also referred to as an alignment control structure) is formed on a pixel electrode in an active matrix substrate. A novolac resin is mainly used as a material for the alignment control structure in terms of costs and ease of procurement. Accordingly, if the alignment control structure is formed on the pixel electrode, the alignment control structure and the first covering layer can be formed of the same material and formed in the same step.

In the present description, the "novolac resin" includes novolac and a compound similar to novolac as long as TMAH and the like can be used together as the developer.

It is preferable that the first covering layer is also made of a material for the component of the active matrix substrate. For example, it is preferable that the first covering layer is made of the same material as a material for the interlayer insulating film. A positive acrylic resin and the like can be commonly used as the material for the interlayer insulating film.

In some cases, it is preferable that the first spacer has light-shielding property. According to this, light leakage due to alignment variation of liquid crystal molecules positioned near the first spacer can be suppressed if a layer which shields the first spacer and the periphery of the first spacer (light-shielding layer) has a small area or such a light-shielding layer is not formed.

In the present description, the "light-shielding property" means an optical density (OD) of 0.5 or more. The following embodiments are mentioned as an embodiment in which the first spacer has light-shielding property. An embodiment (1) in which the first covering layer has light-shielding property; an embodiment (2) in which both of the first base layer and the first covering layer have light-shielding property; and an embodiment (3) in which the first covering layer has light-shielding property attributed to a multilayer structure composed of layers of a plurality of colors such as red, green, and blue.

It is preferable that the active matrix substrate includes a scanning line and a storage capacitor wiring on the substrate, the first spacer is arranged on the scanning line and/or the storage capacitor wiring, and the first spacer is positioned within a region where the scanning line and/or the storage capacitor wiring are/is positioned as viewed in plane. That is, it is preferable that the scanning wiring and the storage capacitor wiring at the position where the first base layer is arranged are wider than the first base layer and the first covering layer in their width direction. The scanning line and the storage capacitor wiring arranged on the active matrix substrate generally have light-shielding property. Accordingly, the first spacer and the vicinity of the first spacer are shielded by the light-shielding wiring arranged on the active matrix substrate. Therefore, the region near the first spacer, where the alignment variation of the liquid crystal molecules is generated, becomes less visible, and as a result, the degradation in display qualities due to the alignment variation of the liquid crystal molecules can be suppressed. The scanning line or the storage capacitor wiring is wider than the signal line, and therefore, the first spacer can be formed on the scanning line or the storage capacitor wiring. Further, if the first spacer is arranged on the scanning line and/or the storage capacitor wiring, a short-circuit between the scanning line or the storage capacitor wiring on the active matrix substrate and a common electrode and the like on the counter substrate can be prevented.

It is preferable that the active matrix substrate further includes a second spacer on the substrate, the second spacer being shorter than the first spacer. In a liquid crystal display device including a spacer such as a photospacer for maintaining a cell gap, generally, if a spacer density is increased, that is, the number of the spacer per unit area is increased to improve withstand load property, when the liquid crystal layer is contracted at low temperatures, the cell gap hardly follows the contraction, and foaming might be generated in the liquid crystal layer. This phenomenon is called low-temperature foaming. For this problem, it is preferable that two different spacers different in height are arranged. In the present invention, the second spacer lower than the first spacer is arranged together with the first spacer, and thereby an effective spacer density is determined only by the first spacer, and the cell gap easily follows the contraction of the liquid crystal layer. As a result, the low-temperature foaming can be suppressed. Further, if a load is applied to the liquid crystal display panel to decrease the cell gap, both of the first and second spacers can support the both substrates. That is, the effective spacer density at this time is determined by both of the first and second spacers, and therefore, a high withstand load property is permitted.

In the present description, "the second spacer" means a sub-spacer in the liquid crystal display panel prepared by attaching the active matrix substrate of the present invention to the counter substrate, that is, a component which is not in contact with the counter substrate when a load is not applied to the liquid crystal display panel but in contact with the counter substrate when a load is applied to the liquid crystal display panel and then the cell gap is decreased. The difference in height between the first spacer and the second spacer is preferably a difference of submicron order, and more preferably 0.2 μm or more and 0.8 μm or less, in view of a high withstand load property.

It is preferable that the second spacer is arranged at a higher density than a density at which the first spacer is arranged in order to have a higher withstand load property. It is preferable that the second spacer is arranged at a density 10 to 20 times or more higher than the density at which the first spacer is arranged. An area of the top of the second spacer is not especially limited as long as the second spacer has a structure which can secure the density 10 to 20 times or more higher than the density of the first spacer. However, it is more preferable that the area of the top of the second spacer is larger than the area of the top of the first spacer in order to secure a high density.

It is preferable that the second spacer includes a second base layer and a second covering layer, the second base layer being buried in the second covering layer. According to this, the top of the second spacer can be flattened, similarly to the first spacer. Therefore, a high withstand load property can be obtained even if a load is applied to the liquid crystal display panel and the cell gap is decreased and then the second spacer contacts with the counter substrate. If the second spacer includes the second base layer and the second covering layer in which the second base layer is buried, as long as the second spacer is lower than the first spacer, preferable configuration, thickness, and shape, and the like, of the second spacer, the second base layer, and the second covering layer are the same as those of the first spacer, the first base layer, and the first covering layer, respectively. Preferable relationships of the film thickness and the shape between the second base layer and the second covering layer are the same as those between the first base layer and the first covering layer.

It is preferable that the second base layer has a thickness of submicron order. The second spacer also has a height of micron order, generally. Therefore, the flattening property of the top of the second spacer can be more improved, similarly to the first spacer. According to this, the height of the second spacer can be substantially continuously varied in submicron order, and therefore this configuration is suitable to establish a difference in height of submicron order between the first spacer and the second spacer.

It is preferable that the second base layer is composed of layers fewer than layers constituting the base layer. Thus, if the number of stacked layers of the first base layer and the second base layer is adjusted, the difference in height between the first spacer and the second spacer can be easily adjusted. Therefore, the withstand load property can be further improved. As a more preferable embodiment of the present invention, an embodiment in which the second base layer is composed of at least one layer selected from layers constituting the first base layer.

It is preferable that the active matrix substrate includes a scanning line, a signal line, a switching element, and a pixel electrode on the substrate, and the second base layer is made of a material for a component of the active matrix substrate. Further, it is preferable that the second base layer is composed of a multilayer film made of the material for the component of the active matrix substrate. According to this, the second base layer and the component of the active matrix substrate can be formed in the same step, and therefore a step of forming the second base layer does not need to be separately performed. In this embodiment, it is preferable that the first base layer is also made of a material for a component of the active matrix substrate or the first base layer is composed of a multilayer film made of a material for a component of the active matrix substrate. According to this, the first and second spacers different in height can be formed without increasing the steps.

It is preferable that the second base layer is made of a material for at least one component selected from the group consisting of the scanning line, the signal line, a semiconductor layer of the switching element, and the pixel electrode. It is also preferable that the second base layer is composed of a multilayer film made of the material for the at least one component selected from the group consisting of the scanning line, the signal line, the semiconductor layer of the switching element, and the pixel electrode. The scanning line, the signal line, the semiconductor layer of the switching element, and the pixel electrode each generally have a thickness of submicron order, and also they are components of the active matrix substrate. According to this embodiment, the top of the second spacer can be flattened without increasing the steps.

It is preferable that the second covering layer includes a resin. It is more preferable that the second covering layer includes a positive photosensitive resin. It is still more preferable that the second covering layer includes a novolac resin. According to this, the same operation and effects as in the cases where the first covering layer includes a resin, the first covering layer includes a positive photosensitive resin, and the first covering layer includes a novolac resin, can be obtained.

It is preferable that the second covering layer is made of a material for the first covering layer. According to this, the first covering layer and the second covering layer can be formed in the same step, which can shorten the steps. If the first and second covering layers are formed under the same coating, exposure, and development conditions, and the like, the difference in height between the first spacer and the second spacer can be established with higher accuracy. If both of the first and second covering layers have a multilayer structure, the second covering layer has the same structure as in the first covering layer, and therefore, these operation and effects can be obtained.

It is preferable that the second spacer includes a resin. According to this, the second spacer can be formed by a spin coating method, a die coating method, and the like. Therefore, the second spacer having a height of micron order can be relatively easily formed.

It is preferable that the first covering layer includes a resin, and the second spacer includes the resin constituting the first covering layer. According to this, the first covering layer and the second spacer can be formed in the same step, which can shorten the steps. Further, attributed to the first base layer constituting the first spacer, the difference in height between the first spacer and the second spacer can be easily established. Further, if the first covering layer and the second spacer are formed under the same coating, exposure, and development conditions, and the like, the difference in height between the first spacer and the second spacer can be established with higher accuracy.

It is preferable that the second spacer includes a positive photosensitive resin. According to this, the second spacer and the active matrix substrate can be formed by the same photolithography system such as exposure and development systems, and therefore, a photolithography system for forming the second spacer does not need to be additionally performed. This embodiment is preferable in this point.

It is preferable that the second spacer has light-shielding property, in some cases. According to this, degradation in display qualities, due to alignment variation of liquid crystal molecules positioned near the second spacer (e.g., light leakage at the time of black state), can be suppressed, even if a layer which shields the second spacer and the vicinity of the second spacer (light-shielding layer) has a small area or such a light-shielding layer is not formed.

It is preferable that the active matrix substrate includes a scanning line and a storage capacitor wiring on the substrate, the second spacer is arranged on the scanning line and/or the storage capacitor wiring, and the second spacer is positioned within a region where the scanning line and/or the storage capacitor wiring are/is positioned as viewed in plane. That is, it is preferable that the scanning line and the storage capacitor wiring at a position where the second spacer is arranged is wider than the second spacer in their width direction. According to this, the second spacer and the vicinity of the second spacer are shielded by the light-shielding wiring arranged on the active matrix substrate. Therefore, the region near the second spacer, where the alignment variation of the liquid crystal molecules is generated, becomes less visible. As a result, the degradation in display quality, due to the alignment variation of the liquid crystal molecules, can be suppressed. The scanning line or the storage capacitor wiring is wider than the signal line, and therefore, the second spacer can be easily arranged on the scanning line or the storage capacitor wiring.

Further, if the second spacer is arranged on the scanning line and/or the storage capacitor wiring, a short-circuit between the scanning line or the storage capacitor wiring on the active matrix substrate and a common electrode and the like on the counter substrate can be prevented.

The present invention is also a liquid crystal display panel having a structure in which a liquid crystal layer is interposed between the active matrix substrate and a counter substrate. According to the active matrix substrate of the present invention, generation of the uneven cell gap can be suppressed without increasing a parasitic capacitance of each wiring. Therefore, the liquid crystal display panel with high display qualities can be provided. The display mode of the liquid crystal display panel is not especially limited. Twisted Nematic (TN) mode, Super Twisted Nematic (STN) mode, Vertical Alignment (VA) mode, Multi-domain Vertical Alignment (MVA) mode, In-plane Switching (IPS) Mode, Optical Compensated Birefringence (OCB) mode, and the like, are mentioned, but VA mode and MVA mode are preferable.

It is preferable that the active matrix substrate includes a structure (alignment control structure) for controlling alignment of liquid crystal molecules constituting the liquid crystal layer, and the first covering layer of the first spacer is made of a material for the structure. According to the MVA liquid crystal display panel, and the like, the alignment control structure is generally formed on the active matrix substrate. Accordingly, the first covering layer is made of the same material as the material for the alignment control structure, and thereby a reduction in throughput (productivity) of the active matrix substrate can be suppressed. It is preferable that the second spacer or the second covering layer is also made of a material constituting the alignment control structure from the same viewpoint.

It is preferable that the counter substrate includes a projection (projective structure) projecting to the liquid crystal layer, the projection being arranged to face the first spacer. If the thickness of the resin layer constituting the first spacer and the like is large, the time taken to perform exposure and development for forming the resin layer and the like increases, and the exposure amount is also increased, which might reduce the throughput of the active matrix substrate. Accordingly, in such a case, a projection is arranged on the counter substrate to face the first spacer, and thereby the thickness of the resin layer and the like constituting the first spacer can be decreased. Therefore, the reduction in throughput of the active matrix substrate can be suppressed. The shape of the projection is not especially limited, and may be a columnar shape, a wall shape, or another shape.

It is preferable that a top of the first spacer is in contact with a flat part of a top of the projection arranged on the counter substrate, and the first spacer is positioned within a region where the flat part of the top of the projection is positioned as viewed in plane. According to such an arrangement, a margin for misalignment at the time when the active matrix substrate is attached to the counter substrate can be secured.

It is preferable that a distance between an edge (periphery) of the top of the first spacer, that is, an edge of the first base layer and an edge of the flat part of the top of the projection is 5.0 μm or more. If the distance is less than 5.0 μm, it might be impossible to sufficiently correspond to the misalignment at the time when the active matrix substrate is attached to the counter substrate.

According to the above-mentioned counter substrate, a projection (projective structure) projecting to the liquid crystal layer may be arranged to face the second spacer. It is preferable that the projection which is arranged to face the first spacer and the projection which is arranged to face the second spacer have the same structure. According to this, the projection projecting to the liquid crystal layer is also arranged to face the second spacer, and thereby a difference in height between the first and second spacers can be adjusted in micron order. Further, a product which is designed to have different cell gaps in micron order can be produced without changing the conditions for the production step, and therefore, a reduction in throughput (productivity) can be suppressed.

If the projection is arranged on the counter substrate to face the second spacer, it is preferable that the top of the second spacer is positioned within a region where the flat part of the top of the projection is positioned as viewed in plane, from the same viewpoint as in the first spacer. Further, it is preferable that a distance between an edge of the top of the second spacer (an edge of the second base layer if the second spacer includes the second base layer and the second covering layer) and an edge of the flat part of the top of the projection is 5.0 µm or more.

It is preferable that the counter substrate includes a structure (alignment control structure) for controlling alignment of liquid crystal molecules constituting the liquid crystal layer, and the projection is made of a material for the alignment control structure. Thus, if the projection is arranged in the same layer where the alignment control structure of the counter substrate is arranged, the reduction in throughput of the counter substrate can be suppressed.

It is preferable that the counter substrate includes a light-shielding layer, and the first spacer is arranged to overlap with the light-shielding layer as viewed in plane. According to this, the first spacer and the vicinity of the first spacer are shielded by the light-shielding layer arranged on the counter substrate. Therefore, the region near the first spacer, where the alignment variation of the liquid crystal molecules is generated, becomes less visible, and as a result, the degradation in display qualities (light leakage at the time of black state), due to the alignment variation of the liquid crystal molecules, can be suppressed.

From the same viewpoint, it is preferable that the second spacer is also arranged to overlap with the light-shielding layer on the counter substrate, as viewed in plane.

The present invention is further a liquid crystal display element including the liquid crystal display panel or a liquid crystal display device including the liquid crystal display panel. According to the liquid crystal display panel of the present invention, generation of the uneven cell gap can be suppressed without an increase in a parasitic capacitance of each wiring. Therefore, a liquid crystal display element or a liquid crystal display device with high display qualities can be provided. The liquid crystal display element is not especially limited as long as it includes the above-mentioned liquid crystal display panel, a polarizer, a gate driver, and a source driver, as a component. The liquid crystal display element may or may not include other components. The liquid crystal display device is not especially limited as long as it includes the above-mentioned liquid crystal display element, a backlight, and a display control circuit as a component. The liquid crystal display element may or may not include other components.

It is preferable that the liquid crystal display device is a television receiver. In a field of the television receiver, a high display quality is now being furthermore demanded along with spread of high-definition television broadcasting and an increase in screen size. The liquid crystal display device of the present invention can provide high display qualities, and therefore a high-quality television receiver can be provided.

In the present description, the "television receiver" means a receiver with which a viewer receives television broadcasting and views displayed images. The television receiver generally has a built-in tuner, but the liquid crystal display device of the present invention may be a monitor which has no built-in tuner.

The present invention is a substrate for liquid crystal display panels, including a third spacer on a substrate, wherein the third spacer includes a third base layer and a covering layer, the third base layer having a thickness of submicron order, the third base layer being buried in the covering layer. According to this, the third base layer pushes up a depression part which is formed when an edge of the third covering layer bulges in a thermocuring step and the like. Therefore, the top of the third spacer can be flattened. The third spacer generally has a height of micron order, and therefore, irregularities of submicron order are often generated at the top of the third spacer. Accordingly, the third base layer has a thickness of submicron order, and thereby the flatness of the top of the third spacer can be more improved. Further, if the third base layer is arranged, a common material which can not suppress a bulge at the edge in the thermocuring step and the like also can be used as a material for the third covering layer, and therefore, a degree of freedom of material selection can be enhanced. Further, according to such a configuration of the third spacer, an overlapping structure of the wirings does not need to be used as the third base layer, and an area of such a structure does not need to be increased. Therefore, an increase in parasitic capacitance of the wirings in the substrate for liquid crystal display panels can be suppressed.

In the present description, similarly to the first spacer, "the third spacer" means a component which regulates a cell gap by being in contact with a surface whose planar area is larger than that of the third spacer of the counter substrate when the substrate for liquid crystal display panels of the present invention is attached to the counter substrate.

The substrate for liquid crystal display panels of the present invention is not especially limited as long as it includes the above-mentioned substrate and the third spacer as a component. The substrate for liquid crystal display panels may or may not include other components. The above-mentioned substrate for liquid crystal display panels is not especially limited as long as it is a substrate used for a liquid crystal display panel. Particularly, an active matrix substrate, a color filter substrate, a passive matrix substrate, and the like, may be mentioned, but the active matrix substrate may be excluded.

Preferable embodiments of the substrate for liquid crystal display panels of the present invention are mentioned.

It is preferable that the third base layer is composed of a multilayer film made of the material for the component of the substrate for liquid crystal display panels.

It is preferable that the third base layer is composed of a multilayer film made of the material for the component of the substrate for liquid crystal display panels.

It is preferable that the third base layer is made of a material for at least one component selected from the group consisting of a common electrode, a metallic light-shielding film, and an organic light-shielding film.

It is preferable that the third base layer is composed of a multilayer film made of the material for the at least one component selected from the group consisting of the common electrode, the metallic light-shielding film, and the organic light-shielding film.

It is preferable that the third covering layer includes a resin.

It is preferable that the third covering layer includes a positive photosensitive resin.

It is preferable that the third covering layer includes a novolac resin.

It is preferable that the third spacer has light-shielding property.

Further, it is preferable that the substrate for liquid crystal display panels further includes a fourth spacer on the substrate, the fourth spacer being shorter than the third spacer.

It is preferable that the fourth spacer includes the fourth base layer and the fourth covering layer in which the fourth base layer is buried.

It is preferable that the fourth base layer has a thickness of submicron order.

It is preferable that the fourth base layer is composed of layers fewer than layers constituting the third base layer.

It is preferable that the fourth base layer is made of a material for a component of the substrate for liquid crystal display panels.

It is preferable that the fourth base layer is composed of a multilayer film made of the material for the component of the substrate for liquid crystal display panels.

It is preferable that the fourth base layer is made of a material for at least one component selected from the group consisting of a common electrode, a metallic light-shielding film, and an organic light-shielding film.

It is preferable that the fourth base layer is composed of a multilayer film made of the material for at least one component selected from the group consisting of the common electrode, the metallic light-shielding film, and the organic light-shielding film.

It is preferable that the fourth covering layer includes a resin.

It is preferable that the fourth covering layer includes a positive photosensitive resin.

It is preferable that the fourth covering layer includes a novolac resin.

It is preferable that the fourth covering layer is made of a material for the third covering layer.

It is preferable that the fourth spacer includes a resin.

It is preferable that the third covering layer includes a resin, and the fourth spacer includes the resin constituting the third covering layer.

It is preferable that the fourth spacer includes a positive photosensitive resin.

It is preferable that the fourth spacer includes a novolac resin.

In some cases, it is preferable that the fourth spacer has light-shielding property.

It is preferable that the substrate for liquid crystal display panels is a color filter substrate.

It is preferable that the substrate for liquid crystal display panels is a passive matrix substrate. According to these substrates for liquid crystal display panels, the same operation and effects as in the active matrix substrate of the present invention can be obtained.

In the present description, similarly to the second spacer, "the fourth spacer" means a sub-spacer in the liquid crystal display panel prepared by attaching the substrate for liquid crystal display panels of the present invention to the counter substrate, that is, a component which is not in contact with the counter substrate when a load is not applied to the liquid crystal display panel but in contact with the counter substrate when a load is applied to the liquid crystal display panel and then the cell gap is decreased.

The present invention is further a liquid crystal display panel having a structure in which a liquid crystal layer is interposed between the substrate for liquid crystal display panels and the counter substrate; or a liquid crystal display element or a liquid crystal display device, each including the liquid crystal display panel. These liquid crystal display panel, liquid crystal display element, and liquid crystal display device can provide the same operation and effects as those in the liquid crystal display panel having a structure in which a liquid crystal layer is interposed between the active matrix substrate of the present invention and the counter substrate, and the liquid crystal display element and the liquid crystal display device, each including the liquid crystal display panel, respectively.

Effect of the Invention

The active matrix substrate of the present invention can suppress generation of uneven cell gap without increasing a parasitic capacitance of a wiring, attributed to the above-mentioned configuration.

BEST MODES FOR CARRYING OUT THE INVENTION

The present invention is mentioned in more detail below with reference to Embodiments using drawings, but not limited to only these Embodiments.

Embodiment 1

FIG. 1 is a planar view schematically showing a configuration of a liquid crystal display device in Embodiment 1.

The liquid crystal display device in the present Embodiment includes a liquid crystal display element 84, a display control circuit 16, and a backlight (not shown), as shown in FIG. 1. The liquid crystal display element 84 includes a liquid crystal display panel 100, a gate driver 11, a source driver 12, a gate terminal part 13, a source terminal part 14, and a printed wire board (PWB) 15. The liquid crystal display panel 100 includes an active matrix substrate and a color filter substrate, and on the back surface side and the observation surface side, a polarizer is attached.

FIG. 2 is a perspective view schematically showing arrangement relationship among a liquid crystal display panel and two polarizers attached thereto. The double arrows in the polarizers 21 and 22 show an axis direction of a polarization axis of each polarizer. The outline arrow shows incident light from a backlight.

As shown in FIG. 2, two polarizers 21 and 22 are attached to the liquid crystal display panel 100, and polarization axes of the polarizers 21 and 22 are perpendicular to each other.

The image display mode of the liquid crystal display device in the present Embodiment is a Multi-domain Vertical Alignment (MVA) mode. Accordingly, if a voltage of less than a threshold or no voltage is applied to a pixel electrode in the liquid crystal display panel 100, liquid crystal is vertically aligned to the polarizers 21 and 22 as well as the substrates. The oscillation direction of incident light which has been polarized by the polarizer 21 is not rotated during passage through the liquid crystal layer in the liquid crystal display panel 100. Therefore, the light is not output from the polarizer 22. As a result, black state is provided. If a voltage of a threshold or more is applied to the pixel electrode in the liquid crystal display panel 100, the liquid crystal is aligned to be inclined to the polarizers 21 and 22 as well as the substrates. The oscillation direction of light which has been polarized by the polarizer 21 is rotated during passage through the liquid crystal layer. Therefore, the light is output from the polarizer 22.

According to the present Embodiment, the liquid crystal is tilted and aligned to four azimuths at 45° relative to axis azimuths of the polarizers 21 and 22 when a voltage of a threshold or more is applied to the pixel electrode in the liquid crystal display panel 100. Thus, the wide viewing angle can be provided by aligning the liquid crystal into four directions, that is, by multi-domain.

"Configuration of Liquid Crystal Display Panel and the Like"

FIG. 3 is a planar view schematically showing a configuration of an active matrix substrate included in a liquid crystal display panel in accordance with Embodiment 1.

FIG. 4 is a planar view schematically showing a configuration of a color filter substrate included in a liquid crystal display panel in accordance with Embodiment 1.

FIG. 5 is a cross-sectional view schematically showing a configuration of a liquid crystal display panel in accordance with Embodiment 1.

The schematic cross-sectional view of the active matrix substrate 1 in FIG. 5 shows the active matrix substrate taken along line A-B in FIG. 3. The schematic cross-sectional view of the color filter substrate 2 in FIG. 5 shows the color filter substrate taken along line A-B in FIG. 4.

As shown in FIGS. 3 and 5, the active matrix substrate 1 includes, on a transparent substrate 60a, a scanning line (a scanning signal line, a gate wiring, agate bus line) 41, a signal line (a data signal line, a source wiring, a source bus line) 42, a storage capacitor wiring (an auxiliary capacitor wiring) 43, a switching element 44, a pixel electrode 45 including an alignment control slit 48, a vertical alignment film (not shown), the first column spacer 46, and the second column spacer 47. A gate insulating film, a passivation film, and the like, are not shown because they are formed over the entire surface of the transparent substrate 60a.

The first spacer 46 is composed of the first dotted base layer 62, a resin layer (the first covering layer) 40 in which the first base layer 62 is buried. The top of the first spacer 46 is flat. A height h1 of the first spacer 46 is about 1.8 µm. The first base layer 62 is composed of a lower part 62a and an upper part 62b. The lower part 62a of the first base layer 62 has a structure in which layers made of the same material as a material for an active semiconductor layer and a low-resistant semiconductor layer of the switching element 44 are stacked, and the upper part 62b of the first base layer 62 is made of the same material as a material for the signal line 42 and a drain-extracting wiring 56. Accordingly, the first base layer 62 can be formed in the same step as the step of forming the active semiconductor layer, the low-resistant semiconductor layer, the signal line 42, and the like. Therefore, the production steps can be simplified.

The lower part 62a of the first base layer 62 has a thickness of about 0.15 µm. The upper part 62a of the first base layer 62 has a thickness of about 0.3 µm. Accordingly, the first base layer 62 has a thickness of about 0.45 µm. The shape of the bottom of the first base layer 62 is a circle with a diameter of 30 µm. The resin layer 40 is made of a phenol novolac resin that is a positive resist. The bottom of the resin layer 40 has a circular shape having a diameter of 45 µm. The thickness of the resin layer 40 is about 1.35 µm.

The second spacer 47 is made of the same phenol novolac resin as a phenol novolac resin constituting the resin layer 40 of the first spacer 46. As shown in FIG. 5, the edge of the top of the second spacer 47 bulges. A height h2 from the bottom to the flat part of the top of the second spacer 47 is about 1.35 µm. A height h3 from the bottom to the edge of the top is about 1.55 µm. Thus, in addition to the first spacer 46, the second spacer 47 that is lower than the first spacer 46 by a height of submicron order is formed, and thereby an effective spacer density is regulated by only the first spacer 46. Therefore, the cell gap easily follows contraction of the liquid crystal layer 61, and therefore, the low-temperature foaming can be suppressed. If a load is applied to the liquid crystal display panel 100 to decrease the cell gap, both of the first spacer 46 and the second spacer 47 can support the both substrates. That is, the effective spacer density can be regulated by both of the first spacer 46 and the second spacer 47, and therefore, a high withstand load property can be provided. According to the present Embodiment, the second spacer 47 is formed at a density equal to 10 to 20 times the density of the first spacer 46. Therefore, a higher withstand load property can be provided.

The second spacer 47 is made of the same phenol novolac resin as a phenol novolac resin constituting the resin layer 40 of the first spacer 46, and therefore, the second spacer 47 and the resin layer 40 can be formed in the same step, and therefore, the steps can be shortened. The second spacer 47 and the resin layer 40 are formed under the same coating, exposure, and development conditions, and the like, and thereby accuracy in difference in height between the first spacer 46 and the second spacer 47 can be enhanced. In addition, the phenol novolac resin also can be used for the switching element 44. Therefore, the resin layer 40 of the first spacer 46, the second spacer 47, and the switching element 44 can be formed by the same photolithography system such as exposure and development systems.

As shown in FIGS. 4 and 5, the color filter substrate 2 includes, on a transparent substrate 60b, a colored layer 51 composed of color filters of three primary colors (red, green, and blue) and the like, a light-shielding layer 52 made of black matrix (BM) and the like, a counter electrode (not shown), a vertical alignment film (not shown), an alignment control structure 53, and a projection 54. The upper surface of the projection 54 has a circular shape with a radius of 65 µm. The projection 54 has a thickness of 1.2 µm. The projection 54 is made of the same resin as a resin for the alignment control structure 53. As shown in FIG. 5, the edges of the top of the projection 54 bulge. Thus, if the projection 54 is made of the same material as a material for the alignment control structure 53, the projection 54 and the alignment control structure 53 can be formed in the same step. Therefore, a reduction in throughput of the color filter substrate 2 can be suppressed.

The liquid crystal display panel 100 has a structure in which the liquid crystal layer 61 is formed between the active matrix substrate 1 and the color filter substrate 2, as shown in FIG. 5. According to the present Embodiment, the first spacer 46 is in contact with the flat part of the projection 54, and thereby a space between the active matrix substrate 1 and the color filter substrate 2 can be maintained. A cell gap D is about 3.5 µm. A seal (not shown) is arranged around the liquid crystal layer 61.

According to the present Embodiment, the cell gap D of the liquid crystal display panel 100 is maintained because the flat top of the first spacer 46 touches the flat part of the top of the projection 54. Therefore, generation of uneven cell gap can be suppressed. The first spacer 46 and the vicinity thereof, and the second spacer 47 and the vicinity thereof are shielded by the scanning line 41 having a light-shielding property and the BM 52. Therefore, the region near the first spacer 46 and the second spacer 47, where the alignment variation of the liquid crystal molecules is generated, becomes less visible, and as a result, the degradation in display qualities due to the alignment variation of the liquid crystal molecules can be suppressed.

According to the present Embodiment, as shown in FIG. 5, the active matrix substrate 1 and the color filter substrate 2 are attached to each other in such a way that the projection 54 faces the first spacer 46 and the second spacer 47. According to this, the thickness of the resin layer 40 constituting the first spacer 46 can be decreased. Therefore, a reduction in throughput of the active matrix substrate 1 can be suppressed. Further, the top of the projection 54 is formed to have an area larger than an area of the top of the first spacer 46. Therefore, the first spacer 46 does not overlap with the edge of the top of the projection 54. The area of the top of the projection 54 is larger than the area of the top of the second spacer 47. Therefore, the tops of the second spacer 47 and the projection 54 do not overlap with each other at their edge. That is, the projection 54 is different from the first and second spacers 46 and 47 in size. Therefore, a margin for misalignment can be secured.

"Production Method of Active Matrix Substrate"

The production method of the active matrix substrate 1 is mentioned below.

First, a metal film such as a multilayer film of titanium (Ti), aluminum (Al), and Ti is formed on a transparent substrate 60a by a sputtering method. This metal film has a thickness of about 0.3 μm. Successively, a resist pattern is formed on the metal film by a photolithography method, and the pattern is dry-etched using etching gas such as chlorine gas. Then, the resist pattern is stripped to form the scanning line 41 and the storage capacitor wiring 43, simultaneously.

Then, by a Chemical Vapor Deposition (CVD) method, a gate insulating film (not shown) made of silicon nitride ($SiN_x$) and the like having a thickness of about 0.4 μm, an active semiconductor layer made of amorphous silicon and the like having a thickness of about 0.1 μm, and a low-resistant semiconductor layer (not shown) made of amorphous silicon and the like doped with phosphorus and the like having a thickness of about 0.05 μm are formed, respectively. When the active semiconductor layer and the low-resistant semiconductor layer are formed, the lower part 62a of the first base layer 62 is formed into a dot pattern in order to have a width not larger than a width of the scanning line 41, as shown in FIG. 5.

A metal film such as Al/Ti multilayer film is formed by a sputtering method. This metal film has a thickness of about 0.3 μm. Successively, a resist pattern is formed on the metal film by a photolithography method. The resist pattern is dry-etched using etching gas such as chlorine gas, and the resist pattern is stripped to form the signal line 42 and the drain-extracting wiring 56, simultaneously. In this case, in addition to the signal line 42 and the drain-extracting wiring 56, and the like, the upper part 62b of the first base layer 62 is formed into a dot pattern on the lower part 62a of the first base layer 62, as shown in FIG. 5. As a result, the first base layer 62 is formed into a dot pattern. The bottom of the dotted first base layer 62 has a diameter of about 30 μm.

An interlayer insulating film (not shown) made of silicon nitride ($SiN_x$) and the like having a thickness of about 0.3 μm is formed by a CVD method. Successively, using a photolithography method, a resist pattern is formed on the interlayer insulating film. Then, the resist pattern is dry-etched using etching gas such as fluorine gas to be stripped. As a result, a contact hole 57 for electrically connecting the drain-extracting wiring 56 to the pixel electrode 45 is formed.

Then, a film made of indium tin oxide (ITO) and the like, having a thickness of about 0.1 μm is formed by a sputtering method. Successively, the resist pattern is formed on the ITO film by a photolithography method, and then etched by an etching solution such as ferric chloride. As a result, the pixel electrode 45 has been formed. The active matrix substrate 1 is used for a liquid crystal display device in MVA mode. Therefore, at the time of the etching, the pixel electrode 45 is provided with the alignment control slit 48.

Then, a phenol novolac resin is coated and temporarily cured, and then exposed, developed, and thermally cured at about 240° C. by a photolithography method. As a result, a resin layer 40 having a thickness of about 1.35 μm and the second column spacer 47 are formed. As a result, the first column spacer 46 and the second column spacer 47 are obtained. The first spacer 46 and the second spacer 47 have a bottom with a diameter of 45 μm φ, and the first and second spacers 46 and 47 are formed within a region of the line width of the scanning line 41. As a developer, a 2.5% by volume aqueous solution of tetramethylammonium hydroxide (TMAH) is used, similarly to another photolithography step.

As a result, the active matrix substrate 1 is completed.

FIG. 6 is a planar view schematically showing a configuration of the first spacer in Embodiment 1. FIG. 7 is a cross-sectional view of the first spacer taken along line C-D in FIG. 6.

According to the first spacer 46 in accordance with the present Embodiment, as shown in FIGS. 6 and 7, the resin layer 40 perfectly covers the dotted first base layer 62. Therefore, the top of the first spacer 46 can be flattened, and specifically, a different in height of the top can be reduced to 0.1 μm or less.

According to the present Embodiment, in order to form the first spacer 46 and the second column spacer 47 to have a difference in height by about 0.45 μm, the following dotted multilayer is used as the first base layer 62 of the first spacer 46. The multilayer includes: a layer with a thickness of about 0.1 μm, made of the same amorphous silicon as amorphous silicon for the active semiconductor layer; a layer with a thickness of about 0.05 μm, made of the same amorphous silicon doped with phosphorus and the like as amorphous silicon for the low-resistant semiconductor layer; and a layer with a thickness of about 0.3 μm, made of the same material as a material for the signal line. In the first base layer 62, the number of layers stacked as the multilayer and the stacked layers themselves are not especially limited. The first base layer 62 may be a multilayer made of the same material as a material for the active semiconductor layer, the signal line, and the pixel electrode, or may be a single layer made of the material for the active semiconductor layer, the signal line, and the pixel electrode. Further, the first base layer 62 may have a multilayer made of one or more different components of a scanning line, a semiconductor layer constituting the switching element, a signal line, and a pixel.

A resin material for the resin layer 40 of the first spacer 46 and the second spacer 47 is not limited to a novolac resin. A photosensitive or nonphotosensitive material such as a polyimide resin, an epoxy resin, an acrylic resin, a urethane resin, a polyester resin, and a polyolefine resin may be used. A colored resin may be used. In this case, a resin into which a colorant has been dispersed or dissolved can be used, and an organic pigment, an inorganic pigment, a dye, and the like, can be preferably used as the colorant. If the light-shielding property is needed, a mixture of pigments of red, blue, and green, and the like, can be used, in addition to metal oxide powders such as carbon black, titanium oxide, and iron tetraoxide, or a light-shielding agent such as metal sulfide powder and metal powder. Among these colorants, carbon black is particularly excellent in light-shielding property. A colored resin layer is used as the resin layer 40 of the first spacer 46, and thereby the resin layer 40 has a light-shielding property and as a result, the effect of making the region where alignment variation is generated less visible can be expected. Similarly to the first spacer 46, the second spacer 47 also may include a base layer (the second base layer). It is preferable that the configuration of each spacer is appropriately selected in order to obtain a desired difference in height.

"Production of Color Filter Substrate"

Then, a production method of the color filter substrate 2 is mentioned below.

First, on a transparent substrate 60b, a negative acrylic photosensitive resin liquid into which carbon fine particles have been dispersed is applied by spin coating, and then dried to give a black photosensitive resin layer. Successively, the black photosensitive resin layer is exposed through a photomask, and then developed. As a result, a black matrix (BM) 52 having a thickness of about 2.0 µm is formed. The BM 52 is formed in such a way that openings (each opening corresponds to each pixel electrode) for forming the first, second, third colored layers are formed in regions where the first colored layer (e.g., red layer), the second colored layer (e.g., green layer), and the third colored layer (e.g., blue layer) are to be formed.

Then, a negative acrylic photosensitive resin liquid into which a pigment has been dispersed is applied into an opening for forming the first colored layer by spin coating. Then, the resin liquid is dried and exposed through a photomask, and developed. As a result, the first colored layer (red layer) having a thickness of about 1.8 µm is formed. Successively, the second colored layer (e.g., green layer) having a thickness of about 1.8 µm, and the third colored layer (e.g., blue layer) are formed in the same manner, and as a result, the colored layer 51 is completed.

Then, a transparent electrode (counter electrode, not shown) made of ITO and the like is formed by a sputtering method. Then, a positive phenol novolac photosensitive resin liquid is applied by a spin coat method, and then dried. The dried resin is exposed through a photomask and developed. As a result, a rib and a sub-rib 53 as a projection for alignment control (alignment control structure) and a projection 54 are formed to have a thickness of about 1.2 µm. The upper surface of the projection 54 has a radius of 65 µm φ.

In such a manner, the color filter substrate is completed.

In the present Embodiment, the case where the BM 52 is made of a resin is shown, but the BM 52 may be made of a metal. The color combination of the colored layers is not limited to red, green, and blue. A combination of cyan, magenta, and yellow, and the like, may be used. A white layer may be included.

"Production of Liquid Crystal Display Panel"

Then, by an ink-jet method, a production method of the liquid crystal display panel 100 is mentioned below.

First, a vertical alignment film for regulating an alignment direction of liquid crystal is formed on each surface in contact with the liquid crystal layer 61, on the active matrix substrate 1 and the color filter substrate 2. Specifically, calcination is performed for degassing treatment and the substrate is washed. Then, the vertical alignment film is applied. Then, the vertical alignment film is calcined and washed, and successively, calcined for degassing treatment.

Then, liquid crystal is injected between the active matrix substrate 1 and the color filter substrate 2. Specifically, a UV curable sealing resin (not shown) is applied around a surface in contact with the liquid crystal layer 61 of the active matrix substrate 1, first. Successively, by a one drop filling (ODF) method, liquid crystal is regularly added dropwise into a part inside the seal on the surface in contact with the liquid crystal layer 61 of the color filter substrate 2. A proper amount of the liquid crystal added dropwise is determined depending on a cell gap and a volume of the liquid crystal to be charged into the cell.

The active matrix substrate 1 to which the seal has been arranged and the color filter substrate 2 to which liquid crystal has been added dropwise are put into an apparatus where the substrates 1 and 2 are to be attached. Then, the atmosphere inside the apparatus is decreased to 1 Pa, and under vacuum pressure, the active matrix substrate 1 and the color filter substrate 2 are attached to each other. According to the present Embodiment, the first spacer 46 and the second spacer 47 of the active matrix substrate 1 are attached to face the BM 52 and the projection 54 on the color filter substrate 2. Then, the atmosphere inside the apparatus is adjusted to atmospheric pressure, and thereby the top of the first spacer 46 touches the flat part of the top of the projection 54, and as a result, a desired cell gap can be obtained. The top of the first spacer 46 is in contact with the flat part of the top of the projection 54. However, the second spacer 47 is lower than the first spacer 46. Therefore, the top of the second spacer 47 is not in contact with the flat part of the top of the projection 54.

A structure where the seal part has been formed to have a desired cell gap is irradiated with UV by a UV curing apparatus, and thereby the seal resin is temporarily cured. Successively, the temporarily cured resin is baked to finally cure the seal resin. After completion of the baking, this structure is divided into units of the liquid crystal display panel, and as a result, a plurality of liquid crystal display panels 100 are obtained.

According to the present Embodiment, the liquid crystal dropwise addition attachment method is explained as a method of injecting the liquid crystal, but a vacuum injection method may be used. According to the vacuum injection method, a thermocurable seal resin with an inlet into which liquid crystal is injected, and the like, is applied to the periphery of the substrates. Successively, the active matrix substrate is attached to the color filter substrate, and then, the inlet is put into liquid crystal in vacuum. Then, the attached substrates are exposed to the atmosphere, and thereby liquid crystal is injected between the active matrix substrate and the color filter substrate, and then, the inlet was sealed with a UV curable resin and the like. However, according to a vertical alignment liquid crystal display panel in the present Embodiment, the time taken to inject the liquid crystal is longer than that in an in-plane liquid crystal display panel. Accordingly, it is preferable that a liquid crystal dropwise addition attachment method is used from viewpoint of improvement in throughput.

"Production of Liquid Crystal Display Element"

Then, a production method of the liquid crystal display element 84 is mentioned below.

First, the liquid crystal display panel 100 is washed. Then, polarizers 21 and 22 are attached to the active matrix substrate 1 and the color filter substrate 2, respectively. An optical compensation sheet and the like may be stacked on the polarizers 21 and 22, if necessary.

Then, the gate driver 11 and the source driver 12 are connected to the liquid crystal display panel 100 by a Tape Carrier Package (TCP) method. Specifically, an anisotropic conductive film (ACF) is pressed and temporarily bonded to a gate terminal 13 and a source terminal 14 of the liquid crystal display panel 100. Then, a TCP on which the gate driver 11 and the source driver 12 are mounted is punched out of a carrier tape. Then, the TCP is positioned with electrodes of the gate terminal 13 and the source terminal 14, and thermally bonded completely.

Then, an input terminal of the TCP on which the gate driver 11 and the source driver 12 are mounted is connected to the PWB 15 through the ACF. Then, the TCPs on which the gate driver 11 and the source driver 12 are mounted are connected to each other through the PWB 15. In such a manner, the liquid crystal display element 84 is completed.

"Production of Liquid Crystal Display Device"

A display control circuit 16 is connected to the driver of the liquid crystal display element 84. Finally, the liquid crystal display element 84 whose driver has been connected to display control circuit 16 is integrated with an illumination device (backlight). As a result, a liquid crystal display device 800 is completed.

"Application to Television Receiver"

An embodiment in which the liquid crystal display device 800 prepared in the present Embodiment is applied to a television receiver is mentioned below.

FIG. 8 is a block diagram showing a configuration of the liquid crystal display device 800 for television receiver. The liquid crystal display device 800 includes a Y/C separation circuit 80, a video chroma circuit 81, an A/D converter 82, a liquid crystal controller 83, a liquid crystal display element 84, a backlight driving circuit 85, a backlight 86, a microcomputer 87, and a gradation circuit 88.

How to display images by the liquid crystal display device 800 is mentioned.

A composite color video signal Scv as a television signal is inputted into the Y/C separation circuit 80 from the outside. The composite color video signal Scv is divided into a luminance signal and a chrominance signal. These luminance signal and chrominance signal are converted into an analogue RGB signal corresponding to three primary colors of light in the video chroma circuit 81. This analogue RGB signal is converted into a digital RGB signal in the A/D converter 82. This digital RGB signal is inputted into the liquid crystal controller 83. In addition, in the Y/C separation circuit 80, the composite color video signal Scv inputted from the outside is also divided into horizontal and vertical synchronizing signals. These synchronizing signals are also inputted into the liquid crystal controller 83 through the microcomputer 87.

Into the liquid crystal display element 84, the digital RGB signal is inputted from the liquid crystal controller 83 together with a timing signal in accordance with the above-mentioned synchronizing signal at a predetermined timing. In the gradation circuit 88, each gradation voltage for three primary colors of R, G, and B of color display is generated and their gradation voltages are also applied to the liquid crystal element 84. In the liquid crystal display element 84, driving signals (data signals, scanning signals, and the like) are generated by the internal source driver or gate driver, and the like, in accordance with the RGB signal, the timing signal, and the gradation voltage. Then, color images are displayed in the inside display part based on their driving signals. In order to display images by this liquid crystal display element 84, light needs to be radiated to the liquid crystal element 84 from the back side of the element 84. According to this liquid crystal display device 800, the backlight driving circuit 85 drives the backlight 86 under the control by the microcomputer 87, and as a result, light is radiated to the back surface of the liquid crystal display element 84.

The microcomputer 87 controls the entire system, including the above-mentioned processing. As the video signal (composite color video signal) inputted from the outside, not only a video signal in television broadcasting but also a video signal in a camera, and a video signal and the like sent through an internet line, may be mentioned. This liquid crystal display device 800 can display images in accordance with various video signals.

FIG. 9 is a block diagram showing connection relationship between a tuner and the display device.

If the liquid crystal display device 800 having the above-mentioned configuration displays images in television broadcasting, a tuner 90 is connected to the liquid crystal display device 800, as shown in FIG. 9. This tuner 90 extracts a signal of a channel to be received from a received wave (high frequency signal) received by an antenna (not shown), and converts this extracted signal into an intermediate frequency signal, and detects this intermediate frequency signal to extract a composite color video signal Scv as a television signal. This composite color video signal Scv is input into the liquid crystal display device 800 as mentioned above. An image in accordance with this composite color video signal Scv is displayed by the liquid crystal display device 800.

FIG. 10 is an exploded perspective view showing one example of a mechanical configuration when the liquid crystal display device of the above-mentioned configuration is applied to a television receiver.

According to the embodiment shown in FIG. 10, the television receiver includes the first case 801 and the second case 806 as well as the above-mentioned liquid crystal display device 800, as components. The liquid crystal display device 800 is interposed between the first case 801 and the second case 806. The first case 801 includes an opening 801a which transmits images displayed by the liquid crystal display device 800. The second case 806 covers the back surface of the liquid crystal display device 800 and it is provided with an operation circuit 805 for operating the liquid crystal display device 800 and a support component 808 is attached to the bottom of the second case 806.

Comparative Embodiment 1

FIG. 11 is a cross-sectional view schematically showing a configuration of a liquid crystal display device in accordance with Comparative Embodiment 1.

FIG. 12 is a cross-sectional view schematically showing a configuration of a spacer for controlling a cell gap in the liquid crystal display device in accordance with Comparative Embodiment 1.

The liquid crystal display device in the present Comparative Embodiment has the same configuration as in Embodiment 1, except for the configuration of the spacer for controlling the cell gap of the liquid crystal display panel. Specifically, according to Embodiment 1, as shown in FIG. 6, the first spacer 46 includes the first base layer 62, but in the present Comparative Embodiment, the spacer 50 has no base layer, as shown in FIGS. 11 and 12. Accordingly, in the present Comparative Embodiment, an edge of the spacer 50 bulges in a thermosetting step during production steps, and the top might not be flat, as shown in FIG. 12.

Such a phenomenon is remarkably observed particularly when the spacer 50 is formed of a phenol novolac positive resist. If such a spacer 50 is prepared to have a thickness of about 1.35 μm under the same conditions as when the resin layer 40 in Embodiment 1 is prepared, 0.25 to 0.33 μm of a difference in height is generated between the edge and the flat center. Thus, according to the liquid crystal display panel, the cell gap is maintained only at the edges. Therefore, if a supporting pin (pin for supporting the substrates at time of transportation and the like) and the like partially applies a load to the substrates in production processes of the panel, the edge is crushed to cause defects in cell gap (cell thickness).

In contrast, according to Embodiment 1 of the present invention, the first base layer 62 is arranged, and thereby the center of the top of the first spacer 46 is flat, as shown in FIG.

6. Further, the edges have no bulge. Therefore, the defects in cell thickness, caused by the crushing of the edges, are not generated.

Embodiment 2

FIG. 13 is a planar view schematically showing a configuration of an active matrix substrate included in a liquid crystal display device in accordance with Embodiment 2.

The liquid crystal display device in the present Embodiment has the same configuration as in Embodiment 1, except for the configuration of the active matrix substrate. Specifically, according to Embodiment 1, as shown in FIG. 3, the pixel electrode 45 is provided with the alignment control slit 48 for controlling alignment of liquid crystal. According to Embodiment 2, an alignment control projection 49 is arranged on the pixel electrode 45, as shown in FIG. 13. The alignment control projection 49 is formed simultaneously with the resin layer 63 of the first spacer 46 and the second spacer 47. Therefore, the production steps are not increased.

Embodiments other than the configuration and the production method of the active matrix substrate are omitted because they are the same as in Embodiment 1.

Embodiment 3

FIG. 14 is a planar view schematically showing a configuration of an active matrix substrate included in a liquid crystal display panel in accordance with Embodiment 3.

FIG. 15 is a planar view schematically showing a configuration of a color filter substrate included in a liquid crystal display panel in accordance with Embodiment 3.

FIG. 16 is a cross-sectional view schematically showing the color filter substrate taken along line A-B in FIG. 15.

The liquid crystal display panel in accordance with the present Embodiment includes column spacers 96 and 97 not on the active matrix substrate 1 but on the color filter substrate (substrate for liquid crystal display panels) 2, as shown in FIGS. 14 to 16.

The third spacer 96 is composed of the third dotted base layer 91 and a resin layer (the third covering layer) 98 in which the third base layer 91 is buried. Further, the top of the third spacer 96 is flat. The third base layer 91 is composed of the same metal material as a metal material for a black matrix 92 in view of simplification of production steps. The bottom of the third base layer 91 has a circular shape with a diameter of 30 μm. The third base layer 91 has a thickness of about 0.3 μm. The resin layer 98 is made of a phenol novolac resin that is a positive resist. The bottom of the resin layer 98 has a circular shape with a diameter of 45 μm. The thickness of the resin layer 98 is about 3.2 μm.

According to the present Embodiment, the flat top of the third spacer 96 is in contact with the active matrix substrate, and thereby the cell gap of the liquid crystal display panel is maintained. As a result, generation of uneven cell gap can be suppressed.

From viewpoint of simplification of production steps, the fourth spacer 97 is made of the same phenol novolac resin as a phenol novolac resin for the resin layer 98 of the third spacer 96. Therefore, as shown in FIG. 16, the edge of the top bulges, and the fourth spacer 97 is lower than the third spacer 96 by a thickness of the third base layer 91. Thus, not only the third spacer 96 but also the fourth spacer 97 that is lower than the third spacer 96 by a height of submicron order are arranged, and thereby an effective spacer density is regulated only by the third spacer 96, and the cell gap easily follows contraction of the liquid crystal layer. Therefore, the low-temperature foaming can be suppressed.

As shown in FIGS. 14 and 15, the third spacer 96 and the vicinity thereof and the fourth spacer 97 and the vicinity thereof are shielded by the storage capacitor wiring 43 having light-shielding property. Therefore, the region near the third spacer 96 and the fourth spacer 97, where the alignment variation of the liquid crystal molecules is generated, becomes less visible. As a result, the degradation in display qualities caused by the alignment variation of liquid crystal molecules (light leakage at the time of black state) can be suppressed.

The present application claims priority under the Paris Convention and the domestic law in the country to be entered into national phase on Patent Application No. 2006-324659 filed in Japan on Nov. 30, 2006, the entire contents of which are hereby incorporated by reference.

The terms "or more" and "or less" in the present description mean that the value described (boundary value) is included.

EXPLANATION OF NUMERALS AND SYMBOLS

Figure 1:
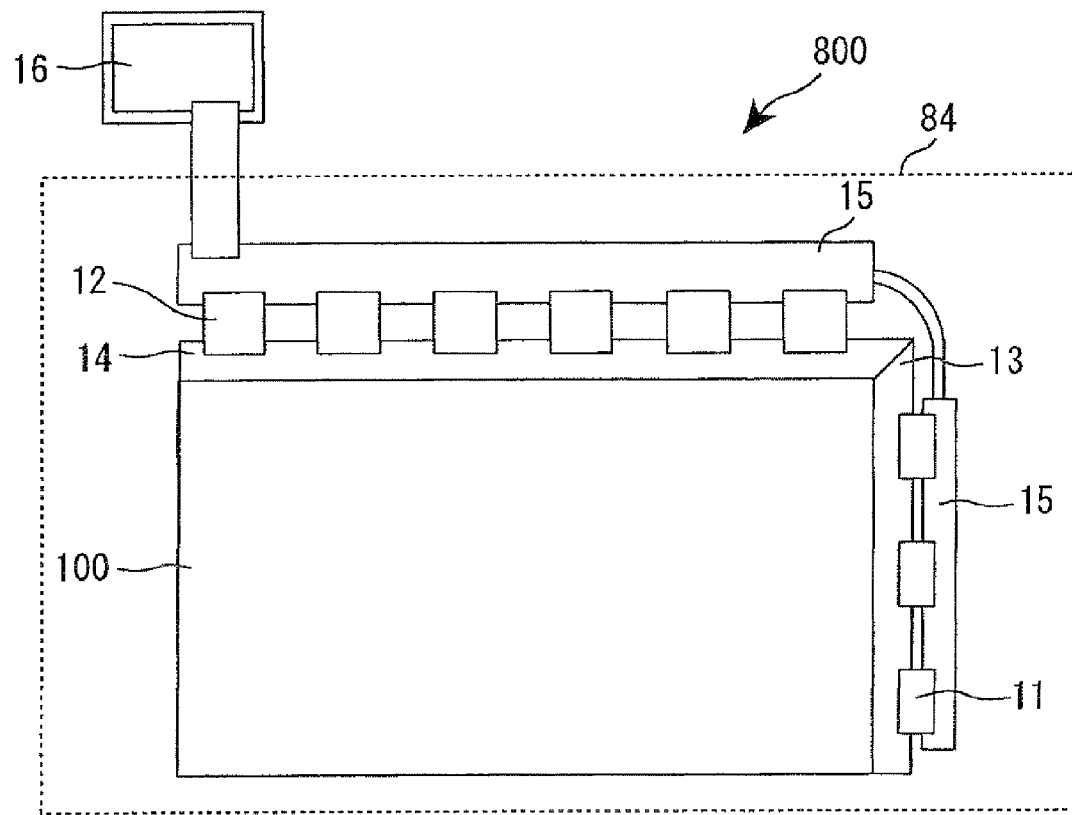
FIG. 1 is a planar view schematically showing a configuration of the liquid crystal display device in Embodiment 1.
Figure 2:
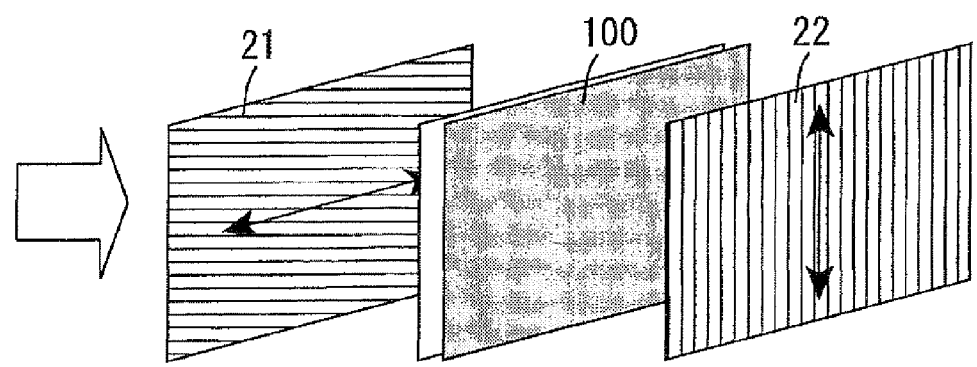
FIG. 2 is a perspective view schematically showing an arrangement relationship among the liquid crystal display panel and two polarizers attached to the liquid crystal display panel in Embodiment 1.
Figure 3:
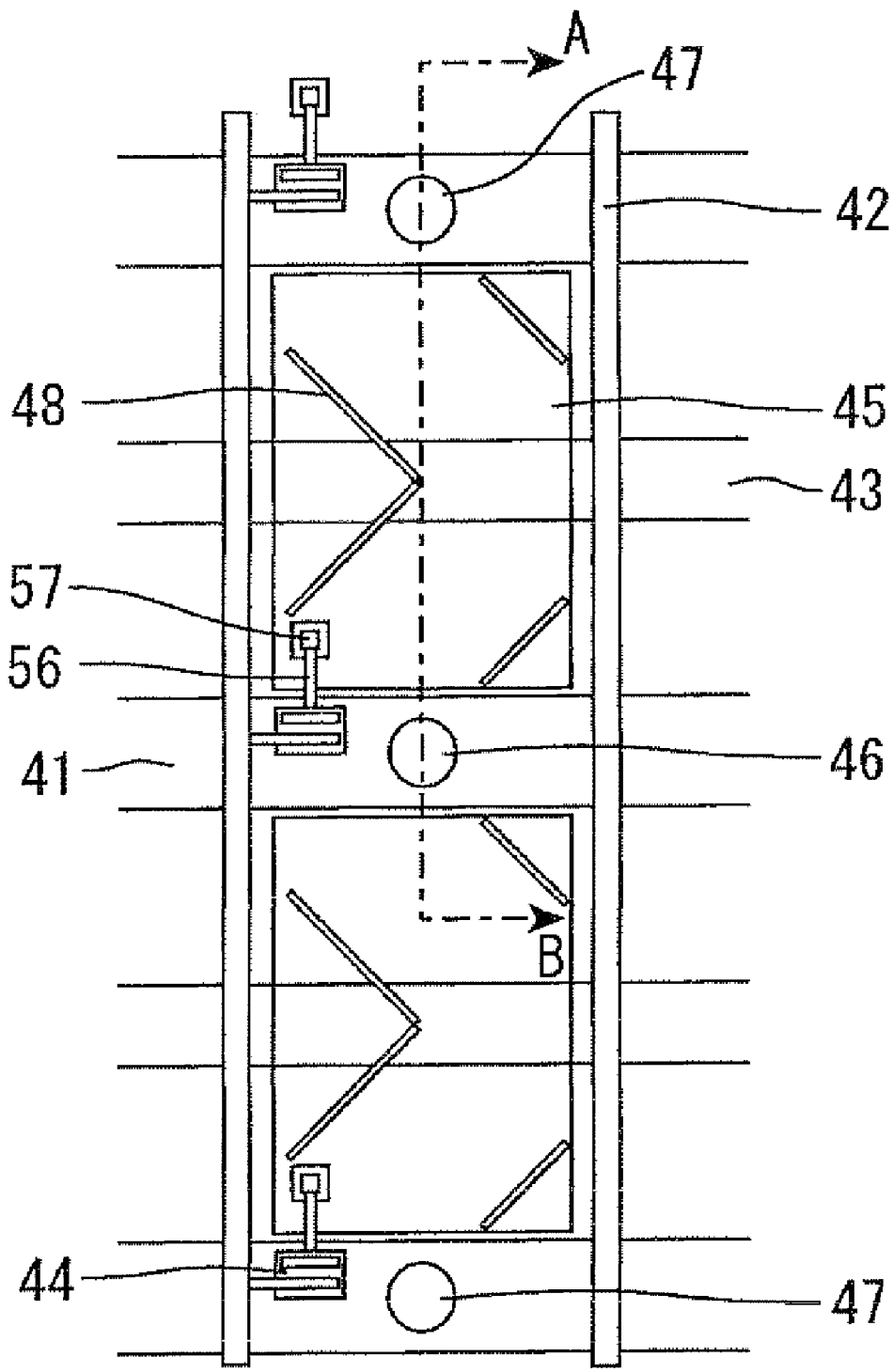
FIG. 3 is a planar view schematically showing a configuration of the active matrix substrate included in the liquid crystal display panel in Embodiment 1.
Figure 4:
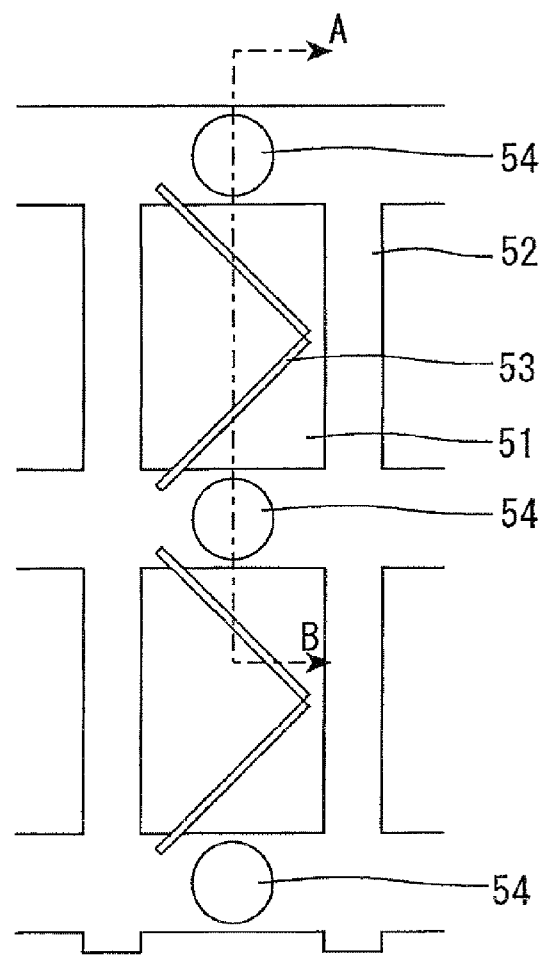
FIG. 4 is a planar view schematically showing a configuration of the color filter substrate included in the liquid crystal display panel in Embodiment 1.
Figure 5:
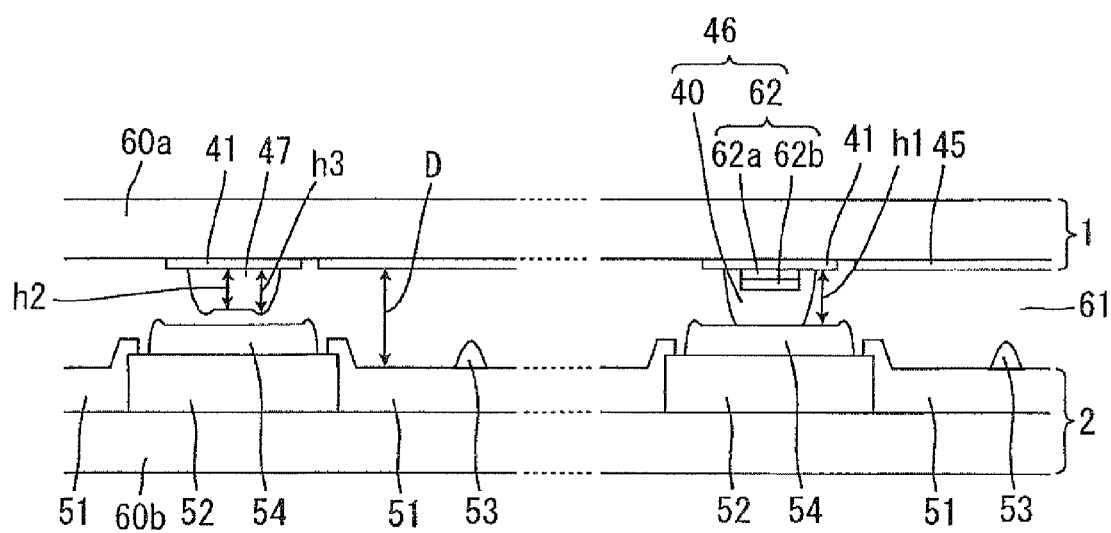
FIG. 5 is a cross-sectional view schematically showing a configuration of the liquid crystal display panel in Embodiment 1.
Figure 6:
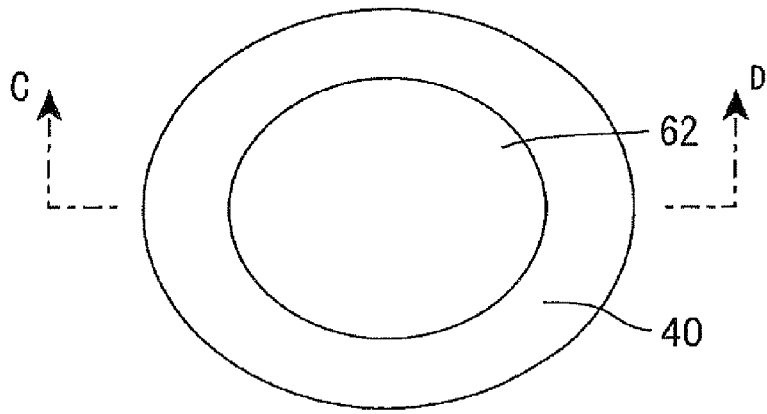
FIG. 6 is a planar view schematically showing a configuration of the first spacer in Embodiment 1.
Figure 7:
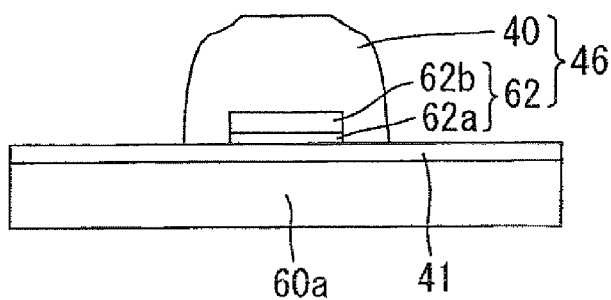
FIG. 7 is a schematic cross-sectional view of the first spacer taken along line C-D in FIG. 6.
Figure 8:
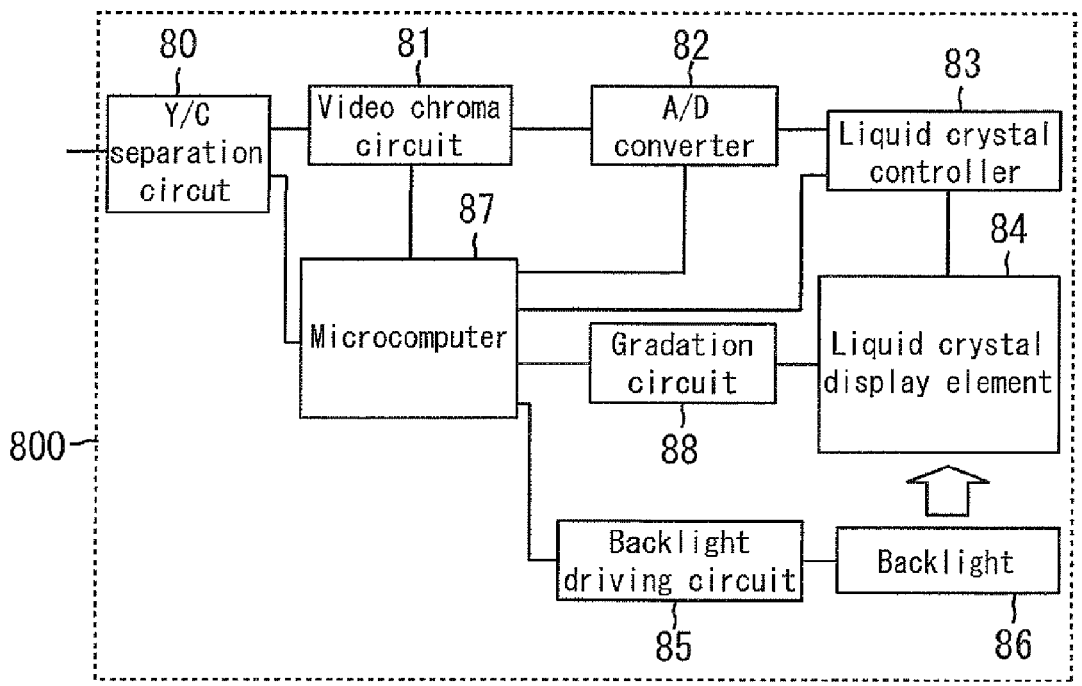
FIG. 8 is a block diagram showing a configuration of the liquid crystal display device for television receivers.
Figure 9:
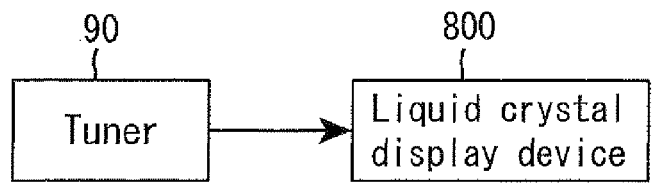
FIG. 9 is a block diagram showing a connection relationship between a tuner and the liquid crystal display device.
Figure 10:
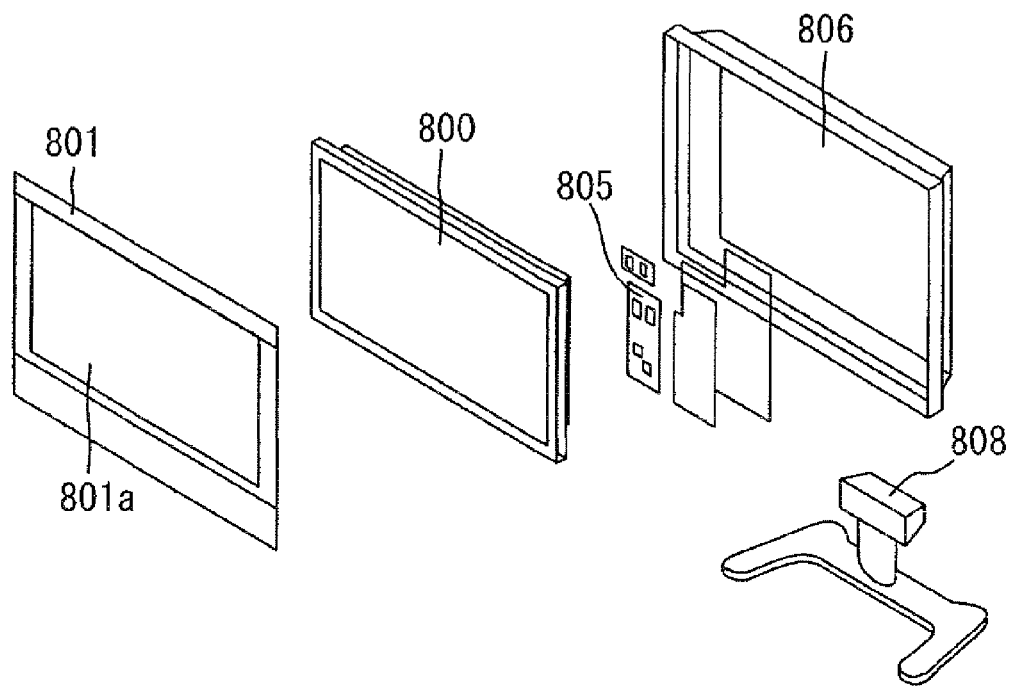
FIG. 10 is an exploded perspective view showing one example of a mechanical configuration if the liquid crystal display device is applied to a television receiver.
Figure 11:
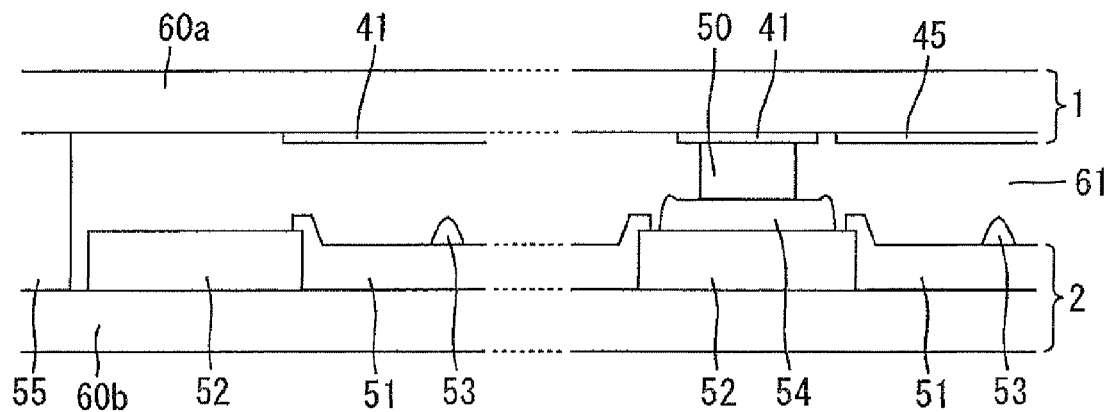
FIG. 11 is a cross-sectional view schematically showing a configuration of the liquid crystal display panel in Comparative Embodiment 1.
Figure 12:
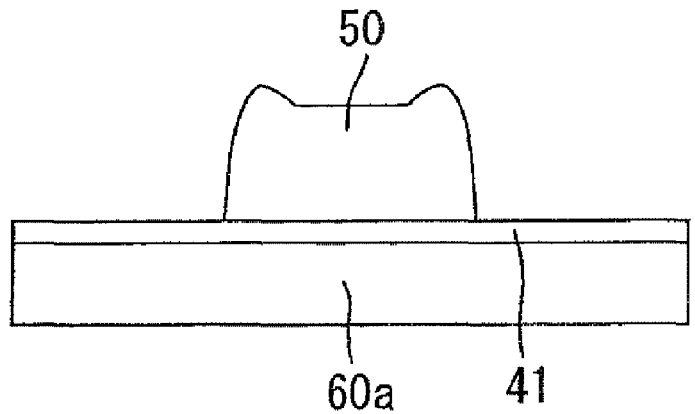
FIG. 12 is a cross-sectional view schematically showing a configuration of the spacer in Comparative Embodiment 1.
Figure 13:
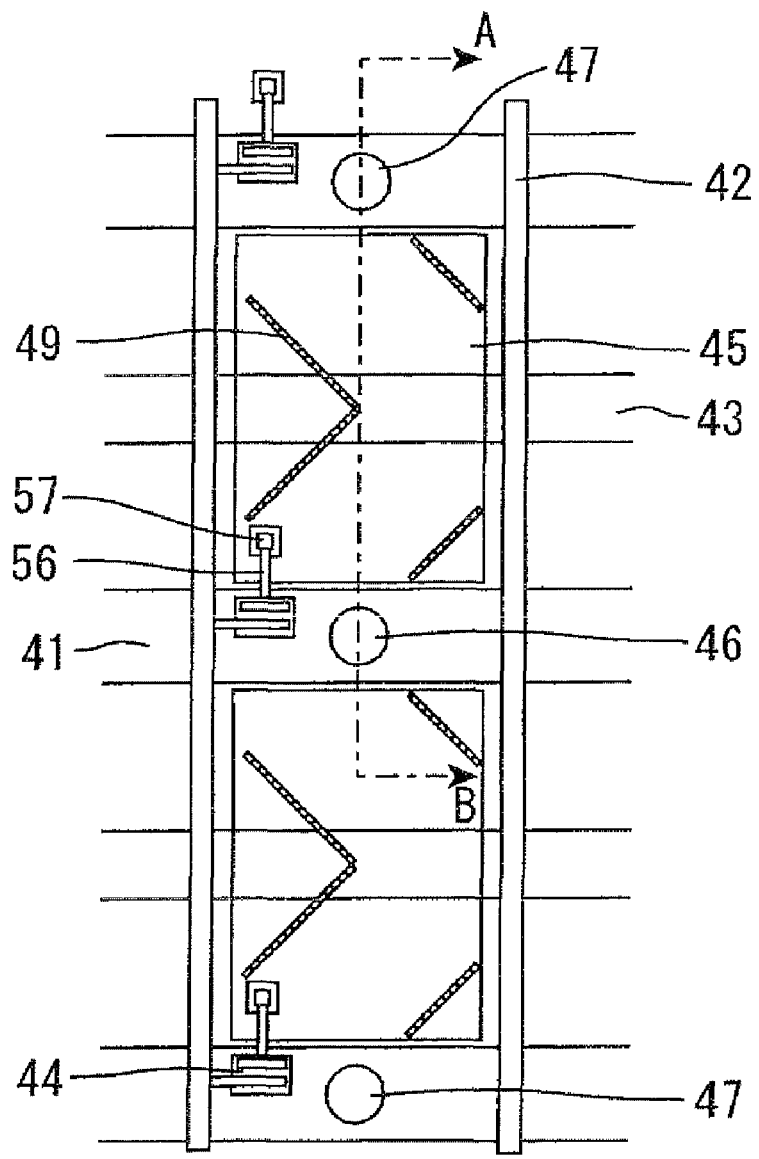
FIG. 13 is a planar view schematically showing a configuration of the active matrix substrate included in the liquid crystal display device in Embodiment 2.
Figure 14:
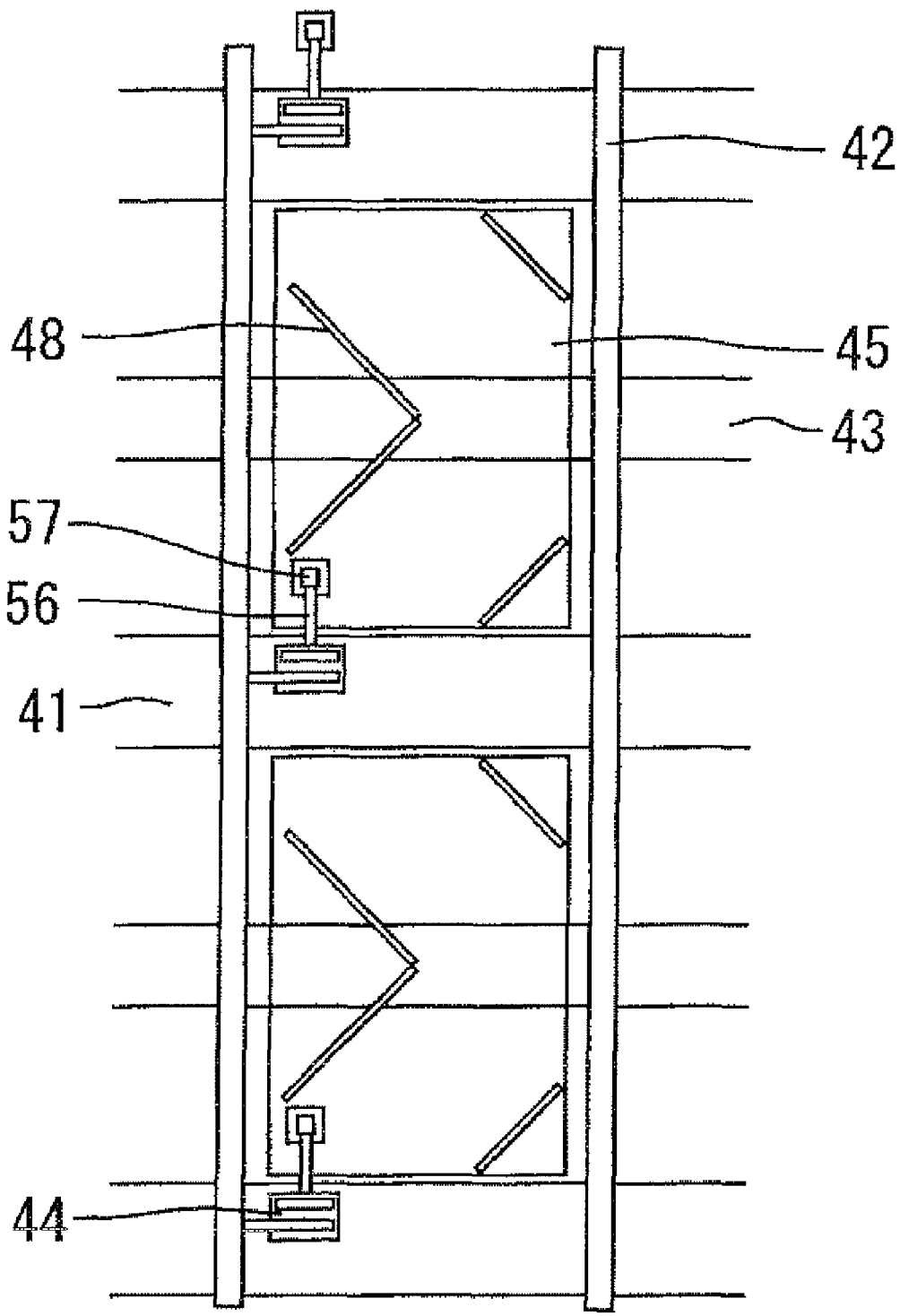
FIG. 14 is a planar view schematically showing a configuration of the active matrix substrate included in the liquid crystal display panel in Embodiment 3.
Figure 15:
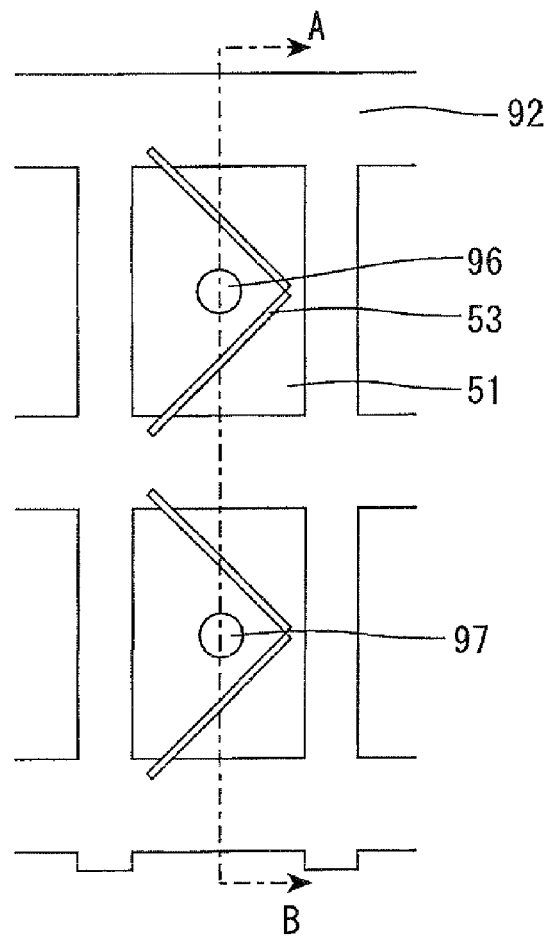
FIG. 15 is a planar view schematically showing a configuration of the color filter substrate included in the liquid crystal display panel in Embodiment 3.
Figure 16:
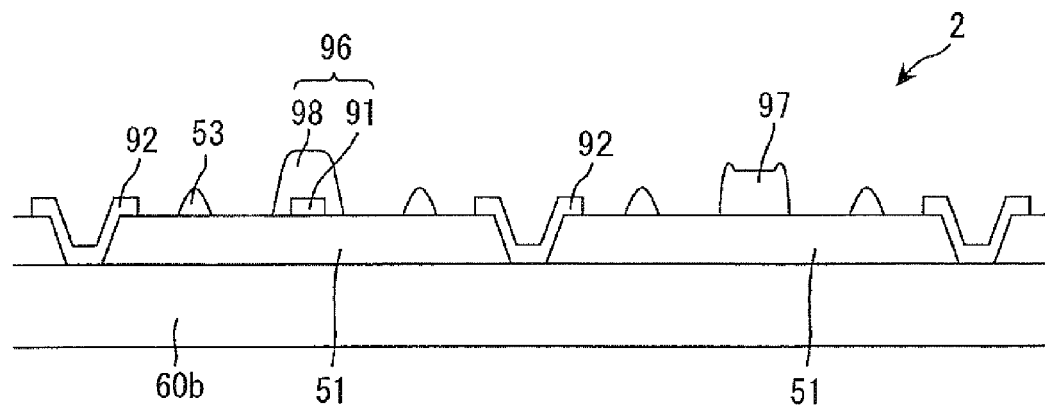
FIG. 16 is a schematic cross-sectional view of the color filter substrate taken along line A-B in FIG. 15.
Figure 17:
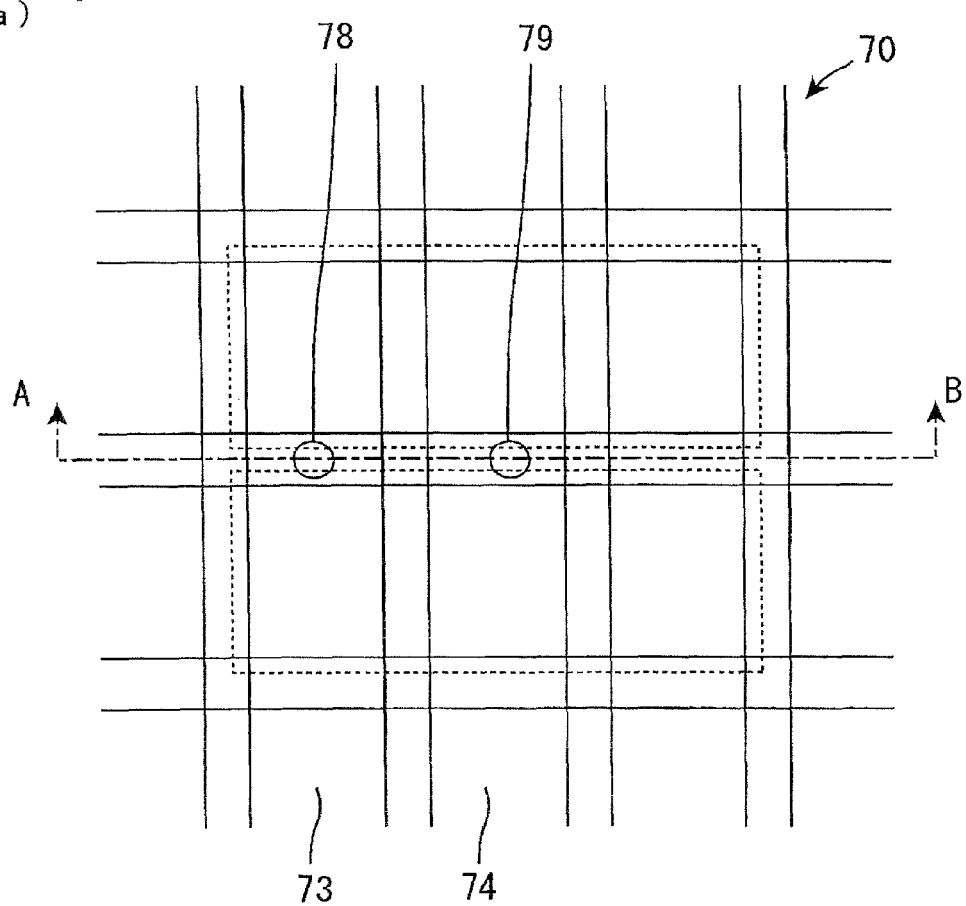
FIG. 17(a) is a planar view schematically showing a configuration of the color filter substrate disclosed in Patent Document 5.
FIG. 17(b) is a schematic cross-sectional view of the color filter substrate taken along line A-B in FIG. 17(a).
Figure 17:
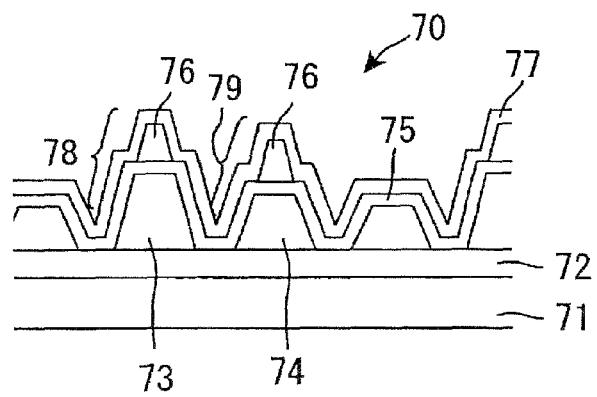
Figure 18:
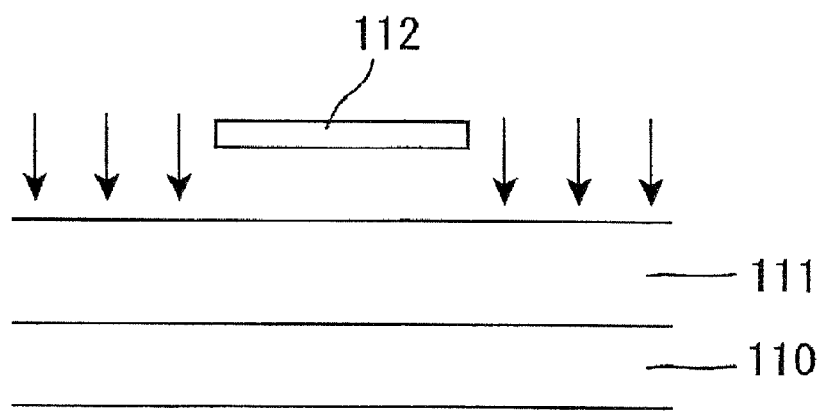
FIGS. 18(a) to 18(c) are cross-sectional views schematically showing formation processes of the PS in Patent Documents 1 and 2.
Figure 18:
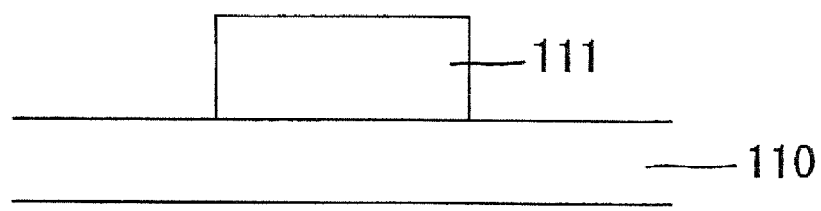
Figure 18:
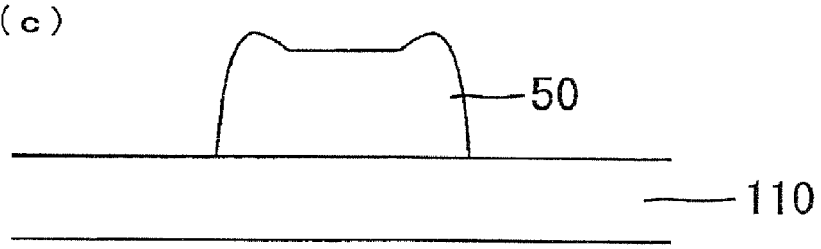
Figure 19:
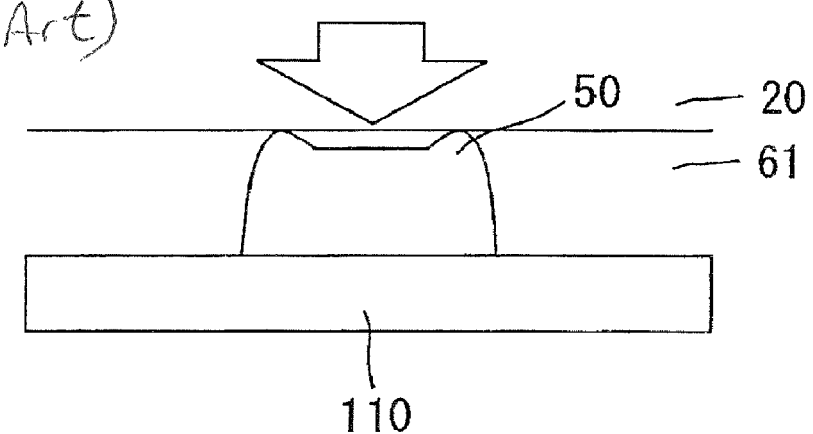
FIG. 19 is a cross-sectional view schematically showing a state where the edge of the PS in Patent Documents 1 and 2 is pressed to the counter substrate. The white arrow represents a stress applied to the counter substrate.
Figure 20:
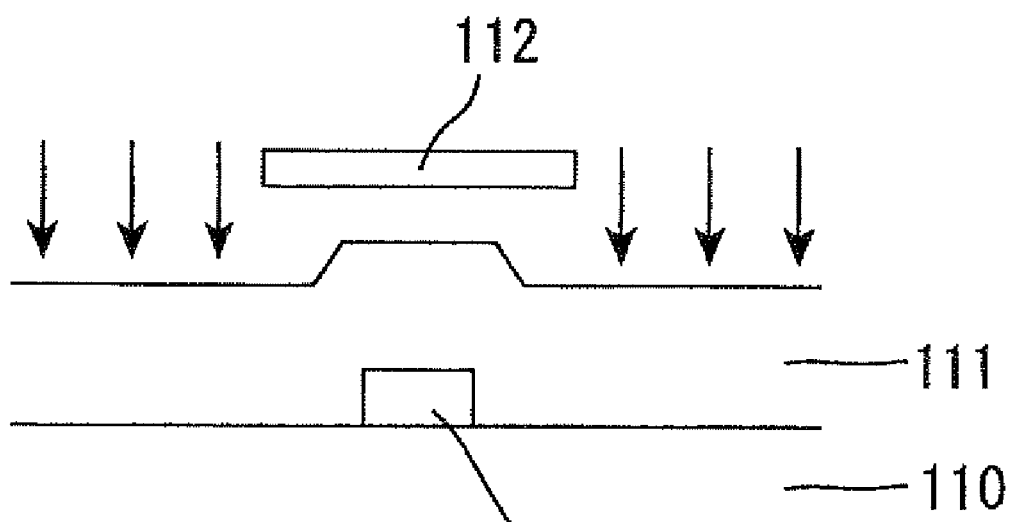
FIGS. 20(a) to 20(c) are cross-sectional views schematically showing production steps of the first spacer of the present invention.
Figure 20:
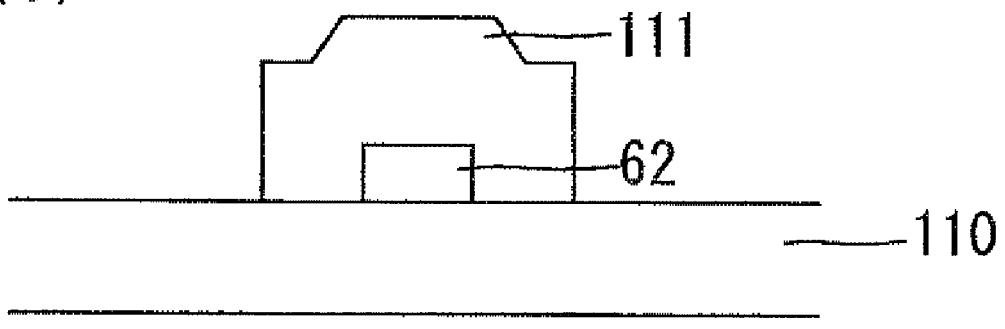
Figure 20:
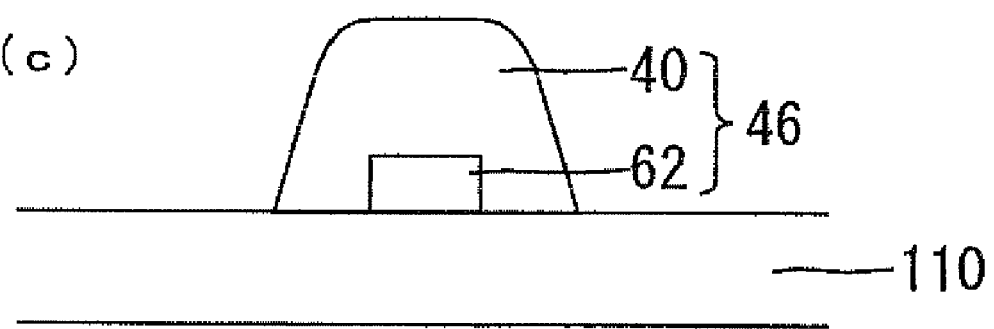

1: Active matrix substrate
2: Color filter substrate
11: Gate driver
12: Source driver
13: Gate terminal
14: Source terminal
15: Printed wire board
16: Display control circuit
20: Counter substrate
21, 22: Polarizer
40: Resin layer (the first covering layer)
41: Scanning line
42: Signal line
43: Storage capacitor wiring
44: Switching element
45: Pixel electrode
46: The first column spacer
47: The second column spacer
48: Alignment control slit
49, 53: Alignment control projection
50: Column spacer without base layer (PS)
51: Colored layer
52: Light-shielding layer
54: Projection
55: Seal
56: Drain-extracting wiring
57: Contact hole
60a, 60b: Transparent substrate
61: Liquid crystal layer
62: Base layer (The first base layer)
62a: Lower part of base layer (lower part of the first base layer)
62b: Upper part of base layer (upper part of the first base layer)
70: Color filter substrate
71: Transparent substrate
72: Black matrix
73, 74: Color filter
75: Common electrode
76: Photosensitive resin layer
77: Alignment film
78, 79: Column spacer
80: Y/C separation circuit
81: Video chroma circuit
82: A/D converter
83: Liquid crystal controller
84: Liquid crystal display element
85: Backlight driving circuit
86: Backlight
87: Microcomputer
88: Gradation circuit
90: Tuner part
91: Base layer (the third base layer)
92: Black matrix (metal layer)
96: The third column spacer
97: The fourth column spacer
98: Resin layer (The third covering layer)
100: Liquid crystal display panel
110: Foundation
111: Photoresist
112: Photomask
800: Liquid crystal display device
801: The first case
801a: Opening
805: Operation circuit
806: The second case
808: Support member

The invention claimed is:

1. An active matrix substrate comprising:
a spacer on a substrate,
wherein the spacer includes a base layer and a covering layer,
wherein the base layer being buried in the covering layer;
wherein the active matrix substrate includes a scanning line, a signal line, a switching element, and a pixel electrode on the substrate,
wherein the base layer is made of a material for a component of the active matrix substrate; and
wherein the base layer is made of a material for at least one component selected from the group consisting of the scanning line, the signal line, a semiconductor layer of the switching element, and the pixel electrode.

2. The active matrix substrate according to claim 1, wherein the base layer has a thickness of submicron order.

3. The active matrix substrate according to claim 1, wherein the covering layer includes a resin.

4. The active matrix substrate according to claim 3, wherein the covering layer includes a positive photosensitive resin.

5. The active matrix substrate according to claim 4, wherein the covering layer includes a novolac resin.

6. The active matrix substrate according to claim 1, wherein the spacer has light-shielding property.

7. An active matrix substrate comprising
a spacer on a substrate,
wherein the spacer includes a base layer and a covering layer,
the base layer being buried in the covering layer, and
wherein the active matrix substrate includes a scanning line and a storage capacitor wiring on the substrate, the spacer is arranged on the scanning line and/or the storage capacitor wiring, and the spacer is positioned within a region where the scanning line and/or the storage capacitor wiring are/is positioned as viewed in plane.

8. The active matrix substrate according to claim 7, wherein the active matrix substrate further includes a second spacer on the substrate,
the second spacer being shorter than the spacer.

9. The active matrix substrate according to claim 8, wherein the second spacer includes a second base layer and a second covering layer,
the second base layer being buried in the second covering layer.

10. The active matrix substrate according to claim 9, wherein the second base layer has a thickness of submicron order.

11. The active matrix substrate according to claim 9, wherein the second base layer is composed of layers fewer than layers constituting the base layer.

12. The active matrix substrate according to claim 9, wherein the second covering layer includes a resin.

13. The active matrix substrate according to claim 12, wherein the second covering layer includes a positive photosensitive resin.

14. The active matrix substrate according to claim 13, wherein the second covering layer includes a novolac resin.

15. The active matrix substrate according to claim 9, wherein the second covering layer is made of a material for the covering layer.

16. The active matrix substrate according to claim 8, wherein the second spacer includes a resin.

17. The active matrix substrate according to claim 16, wherein the covering layer includes a resin, and
the second spacer includes the resin constituting the covering layer.

18. The active matrix substrate according to claim 16, wherein the second spacer includes a positive photosensitive resin.

19. The active matrix substrate according to claim 18, wherein the second spacer includes a novolac resin.

20. The active matrix substrate according to claim 8, wherein the second spacer has light-shielding property.

21. An active matrix substrate comprising
a spacer on a substrate,
wherein the spacer includes a base layer and a covering layer,
the base layer being buried in the covering layer,
wherein the active matrix substrate further includes a second spacer on the substrate, the second spacer being shorter than the spacer;
wherein the second spacer includes a second base layer and a second covering layer, the second base layer being buried in the second covering layer, and
wherein the active matrix substrate includes a scanning line, a signal line, a switching element, and a pixel electrode on the substrate, and the second base layer is made of a material for a component of the active matrix substrate.

22. The active matrix substrate according to claim 21, wherein the second base layer is composed of a multilayer film made of the material for the component of the active matrix substrate.

23. The active matrix substrate according to claim 21, wherein the second base layer is made of a material for at least one component selected from the group consisting of the scanning line, the signal line, a semiconductor layer of the switching element, and the pixel electrode.

24. The active matrix substrate according to claim 23, wherein the second base layer is composed of a multilayer film made of the material for the at least one component selected from the group consisting of the scanning line, the signal line, the semiconductor layer of the switching element, and the pixel electrode.

25. An active matrix substrate comprising:
a spacer on a substrate,
wherein the spacer includes a base layer and a covering layer,
the base layer being buried in the covering layer,
wherein the active matrix substrate further includes a second spacer on the substrate, the second spacer being shorter than the spacer, and
wherein the active matrix substrate includes a scanning line and a storage capacitor wiring on the substrate, the second spacer is arranged on the scanning line and/or the storage capacitor wiring, and the second spacer is positioned within a region where the scanning line and/or the storage capacitor wiring are/is positioned as viewed in plane.

26. A liquid crystal display panel having a structure in which a liquid crystal layer is interposed between the active matrix substrate of claim 25 and a counter substrate.

27. The liquid crystal display panel according to claim 26, wherein the active matrix substrate includes a structure for controlling alignment of liquid crystal molecules constituting the liquid crystal layer, and
the covering layer of the spacer is made of a material for the structure.

28. The liquid crystal display panel according to claim 26, wherein the counter substrate includes a projection projecting to the liquid crystal layer,
the projection being arranged to face the spacer.

29. The liquid crystal display panel according to claim 28, wherein a top of the spacer is in contact with a flat part of a top of the projection arranged on the counter substrate, and
the spacer is positioned within a region where the flat part of the top of the projection is positioned as viewed in plane.

30. The liquid crystal display panel according to claim 28, wherein the counter substrate includes a structure for controlling alignment of liquid crystal molecules constituting the liquid crystal layer, and
the projection is made of a material for the structure.

31. The liquid crystal display panel according to claim 26, wherein the counter substrate includes a light-shielding layer, and
the spacer is arranged to overlap with the light-shielding layer as viewed in plane.

32. A liquid crystal display element comprising the liquid crystal display panel of claim 26.

33. A liquid crystal display device comprising the liquid crystal display panel of claim 26.

34. The liquid crystal display device according to claim 33, wherein the liquid crystal display device is a television receiver.

35. A substrate for liquid crystal display panels, comprising
a third spacer on a substrate,
wherein the third spacer includes a third base layer and a third covering layer,
the third base layer having a thickness of submicron order,
the third base layer being buried in the third covering layer,
wherein the third base layer is made of a material for a component of the substrate for liquid crystal display panels,
wherein the third base layer is composed of a multilayer film made of the material for the component of the substrate for liquid crystal display panels, and
wherein the third base layer is made of a material for at least one component selected from the group consisting of a common electrode, a metallic light-shielding film, and an organic light-shielding film.

36. The substrate for liquid crystal display panels according to claim 35,
wherein the third base layer is composed of a multilayer film made of the material for the at least one component selected from the group consisting of the common electrode, the metallic light-shielding film, and the organic light-shielding film.

37. The substrate for liquid crystal display panels according to claim 35, wherein the third covering layer includes a resin.

38. The substrate for liquid crystal display panels according to claim 37, wherein the third covering layer includes a positive photosensitive resin.

39. The substrate for liquid crystal display panels according to claim 38, wherein the third covering layer includes a novolac resin.

40. The substrate for liquid crystal display panels according to claim 35, wherein the third spacer has light-shielding property.

41. The substrate for liquid crystal display panels according to claim 35,
wherein the substrate for liquid crystal display panels further includes a fourth spacer on the substrate, the fourth spacer being shorter than the third spacer.

* * * * *